Jan. 27, 1959 D. V. FRANKE 2,871,469

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952 10 Sheets-Sheet 1

INVENTOR.
DALLAS V. FRANKE

BY Lyon & Lyon

ATTORNEYS

INVENTOR.
DALLAS V. FRANKE
BY Lyon & Lyon
ATTORNEYS

Jan. 27, 1959 D. V. FRANKE 2,871,469

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952 10 Sheets-Sheet 3

INVENTOR.
DALLAS V. FRANKE
BY Lyon & Lyon
ATTORNEYS.

Jan. 27, 1959 D. V. FRANKE 2,871,469

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952 10 Sheets-Sheet 4

INVENTOR.
DALLAS V. FRANKE
BY Lyon & Lyon
ATTORNEYS

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952

INVENTOR.
DALLAS V. FRANKE
BY Lyon & Lyon
ATTORNEYS

Jan. 27, 1959 D. V. FRANKE 2,871,469

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952 10 Sheets-Sheet 6

INVENTOR.
DALLAS V. FRANKE
BY Lyon & Lyon
ATTORNEYS

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952

INVENTOR.
DALLAS V. FRANKE
BY
Lyon & Lyon
ATTORNEYS

Jan. 27, 1959 D. V. FRANKE 2,871,469

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952 10 Sheets-Sheet 8

INVENTOR.
DALLAS V. FRANKE
BY Lyon & Lyon
ATTORNEYS

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952

INVENTOR.
DALLAS V. FRANKE
BY Lyon & Lyon
ATTORNEYS

Jan. 27, 1959 D. V. FRANKE 2,871,469

ELECTRIC COMPUTER USING NON-LINEAR CIRCUIT ELEMENTS FOR DERIVING A VOLTAGE REPRESENTATIVE OF AN IDEAL FLIGHT PATH

Filed Jan. 11, 1952 10 Sheets-Sheet 10

INVENTOR.
DALLAS V. FRANKE
BY Lyon & Lyon
ATTORNEYS 2,871,469

United States Patent Office

Patented Jan. 27, 1959

2,871,469

ELECTRIC COMPUTER USING NON-LINEAR CIRCUIT ELEMENTS FOR DERIVING A VOLTAGE REPRESENTATIVE OF AN IDEAL FLIGHT PATH

Dallas Valo Franke, Redondo Beach, Calif., assignor to Gilfillan Bros. Inc., Los Angeles, Calif., a corporation of California Application January 11, 1952, Serial No. 266,001

8 Claims. (Cl. 343—11)

The present invention relates to improved means and techniques whereby an electrical characteristic is developed representative of predetermined patterns and, while the uses of these means and techniques are numerous, as suggested to one skilled in the art, the present invention is described as applied in an automatic ground controlled approach (AGCA) system of the character described and claimed in my copending application with others, Serial No. 398,288, filed December 15, 1953.

In the AGCA system described in the above-mentioned copending application, two antennas are used to scan the approach zone to an aircraft landing field, one of which antennas scans in the horizontal or azimuth plane while the other antenna scans, on a time sharing basis with the previously mentioned antenna, in the elevation plane. A voltage, termed the "antenna beam angle voltage," is developed, the instantaneous magnitude of such voltage serving as a measure of the angular position of the azimuth antenna beam or the elevation antenna beam, as the case may be. Also, the AGCA system incorporates means for automatically tracking the aircraft in its flight from a range ten miles remote from the aircraft touchdown point; and during such tracking operation, a voltage, termed the "range voltage," is developed, the instantaneous magnitude of such range voltage serving as a measure of the distance of the tracked aircraft from the situs of the radar equipment. For obvious reasons, the situs of the radar equipment is adjacent the aircraft landing field, and of course the situs does not correspond to the aircraft touchdown point.

The general purpose of the AGCA system is to develop, at the situs of the radar equipment, control signals for transmission to the autopilot approach coupler of the aircraft so that such aircraft automatically flies along a predetermined glidepath (in the elevation plane) and along a predetermined course line (in the horizontal or azimuthal plane).

These control signals cause the aircraft to fly up and down with respect to such glidepath or to the right or left of the course line, as required for flight along such glidepath and course line.

In developing such control voltages, an electronic computation is effectively made of the instantaneous location of the aircraft with respect to the predetermined glidepath and course line. In effecting such electronic computation, the predetermined ideal glidepath and course line are each represented by an electrical quantity, in this case such quantity being an alternating voltage, the zero or cross-over points of which correspond to the ideal glidepath or course line, as the case may be.

In developing such alternating voltages, it is necessary to take into consideration the fact that the situs of the radar equipment is not coincident with the aircraft touchdown point.

The afore-mentioned electrical quantity representing the glidepath and course line is obtained, in general, by combining the afore-mentioned azimuth antenna or elevation antenna angle voltage, as the case may be, with the afore-mentioned range voltage. By thus correlating the angular position of the antenna beam with the range of an aircraft being tracked, the position of the aircraft is determined. However, certain compensation must be made for the afore-mentioned noncoincident relationship between the situs of the radar equipment and the aircraft touchdown point. This compensation is made herein according to important features of the present invention and generally, involves the use of a nonlinear circuit parameter such as thyrite for purposes of modifying the range voltage before the range voltage thus modified is used, for comparison purposes, with the azimuth or elevation antenna beam voltage, as the case may be.

It is therefore an object of the present invention to provide improved means and techniques useful in effecting an electronic computation of desired or ideal flight paths.

A specific object of the present invention is to provide apparatus for establishing electrical quantities representative of an ideal glidepath in the elevation plane and simultaneously a predetermined course line for the same object in the horizontal or azimuthal plane.

Another specific object of the present invention is to provide an improved electronic computer of the character described herein especially useful in the AGCA system described in the above-mentioned copending application.

Another specific object of the present invention is to provide an improved electronic computer for establishing an ideal glidepath and course line using a nonlinear circuit parameter such as thyrite, in which the thyrite is present under conditions when the aircraft being tracked is close to touchdown. However, the circuit under such conditions is dependent to a small degree on the nonlinear characteristic of the thyrite so that a much more reliable and stable circuit is produced than would otherwise be the case where greater dependency is placed on the thyrite when accuracy is needed most.

Another specific object of the present invention is to provide improved circuitry for computing electronically predetermined ideal glidepaths and course lines for controlling the flight of aircraft to a point of touchdown, even though the data for such purpose is obtained from radar equipment noncoincident with the touchdown point.

Another specific object of the present invention is to provide improved circuitry for accepting data as to the orientation and range of an aircraft assumed to be flying along an ideal glidepath and course line, and developing from such data an electrical characteristic representative of such ideal glidepath and course line so that such electrical characteristic may be used in developing control signals for transmission to an actual aircraft, the flight of which deviates from such ideal glidepath or course line.

Another specific object of the present invention is to provide improved circuitry for the purposes mentioned above, the circuitry being characterized by its increased stability at or near touchdown and reduction of circuit complexity, and which allows a high degree of flexibility in curve fitting.

In the AGCA system, the afore-mentioned antenna beam angle voltage varies from two volts to 52 volts in accordance with the angular position of the antenna beam being radiated.

The present arrangement, generally, contemplates the production of an alternating voltage from this antenna beam angle voltage combined with the afore-mentioned range voltage. In effecting such combination, the antenna beam angle voltage is first level shifted and simultaneously the range voltage is modified by applying the same to a nonlinear circuit element such as thyrite, and the range voltage thus modified is combined with the level shifted antenna beam angle voltage, either azimuth or elevation, as the case may be at that particular time.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic form apparatus for scanning the approach zone to an aircraft landing field with related circuitry for producing a visual indication of the character illustrated in Figure 6; also this apparatus serves to develop information such as azimuth angle voltage, elevation angle voltage, video, blanking voltages and az-el relay voltages used in the automatic ground controlled approach (AGCA) system illustrated in Figure 7.

Figure 7:
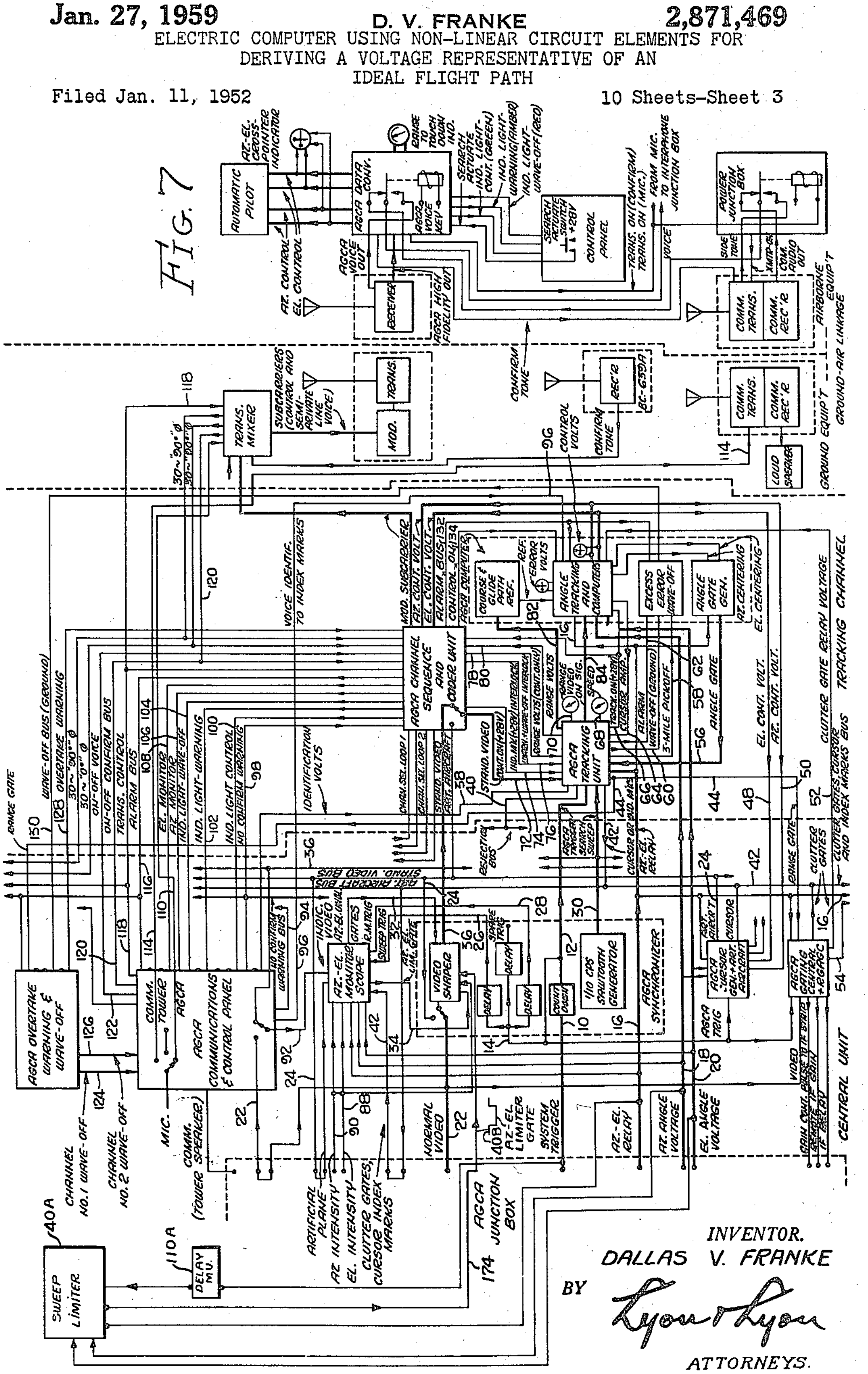
Figure 7 is a block diagram of an AGCA system embodying features of the present invention which is supplied with certain information developed by the apparatus illustrated in Figure 1.
Figure 10A:
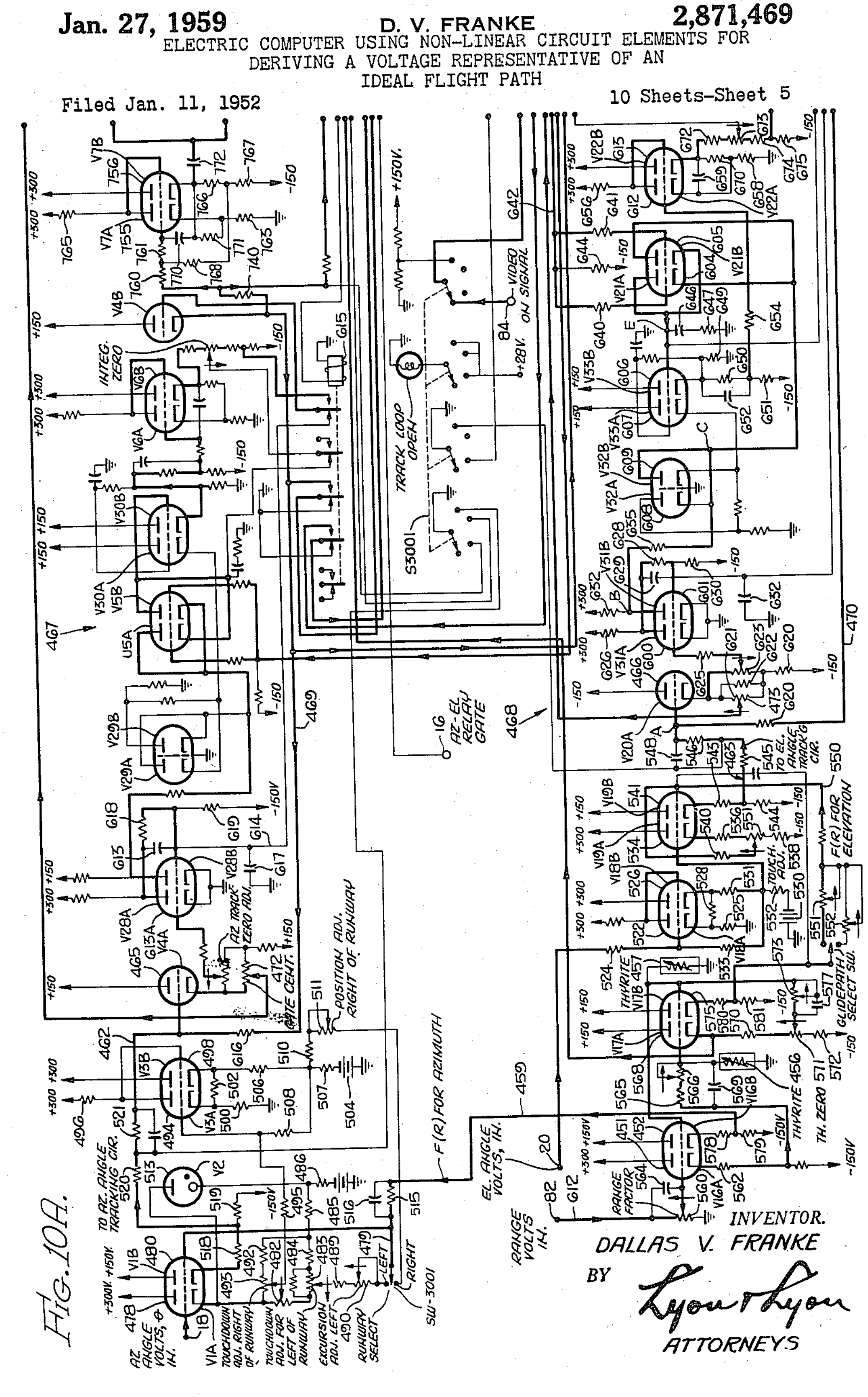
Figure 10B:
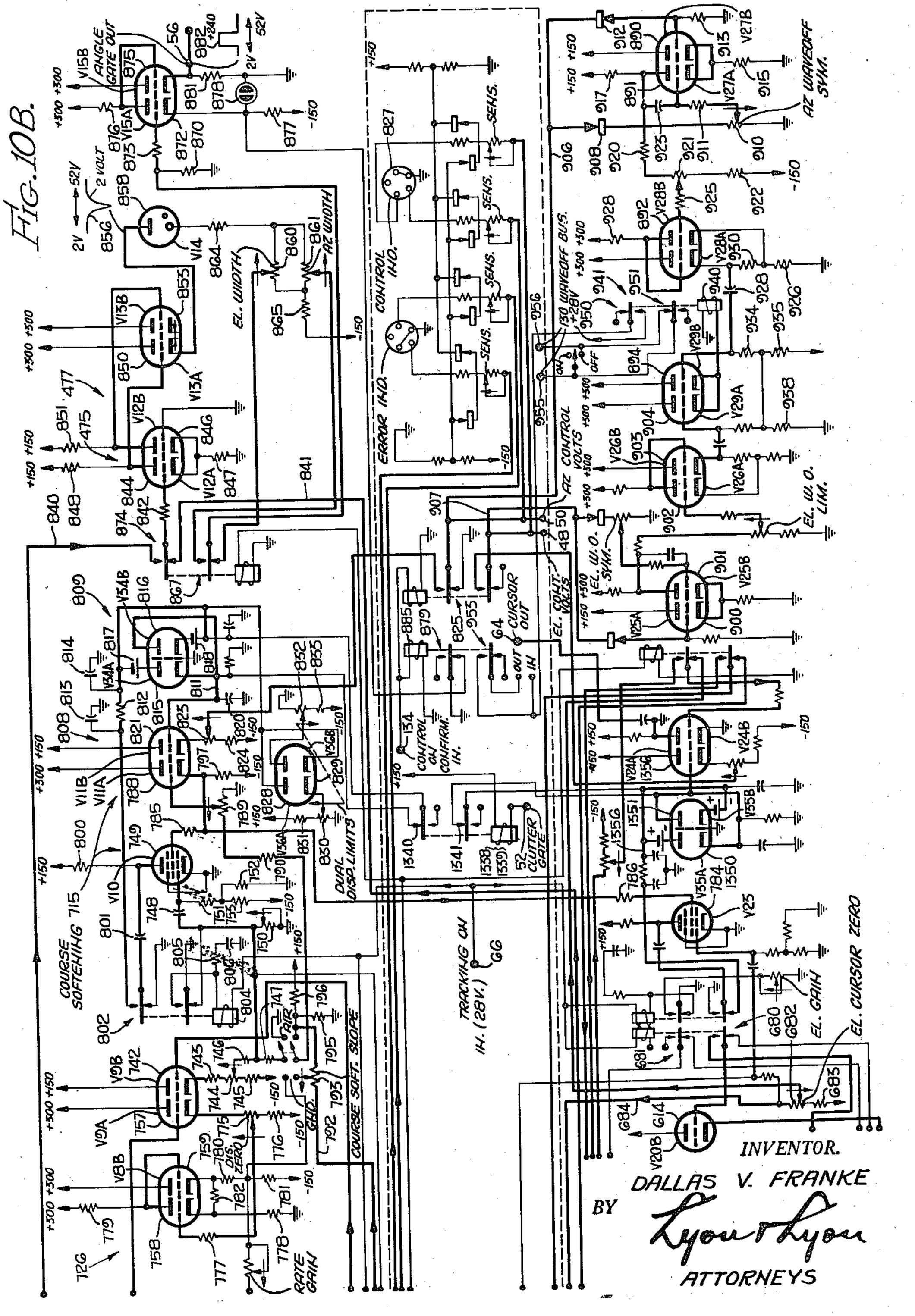
Figure 11:
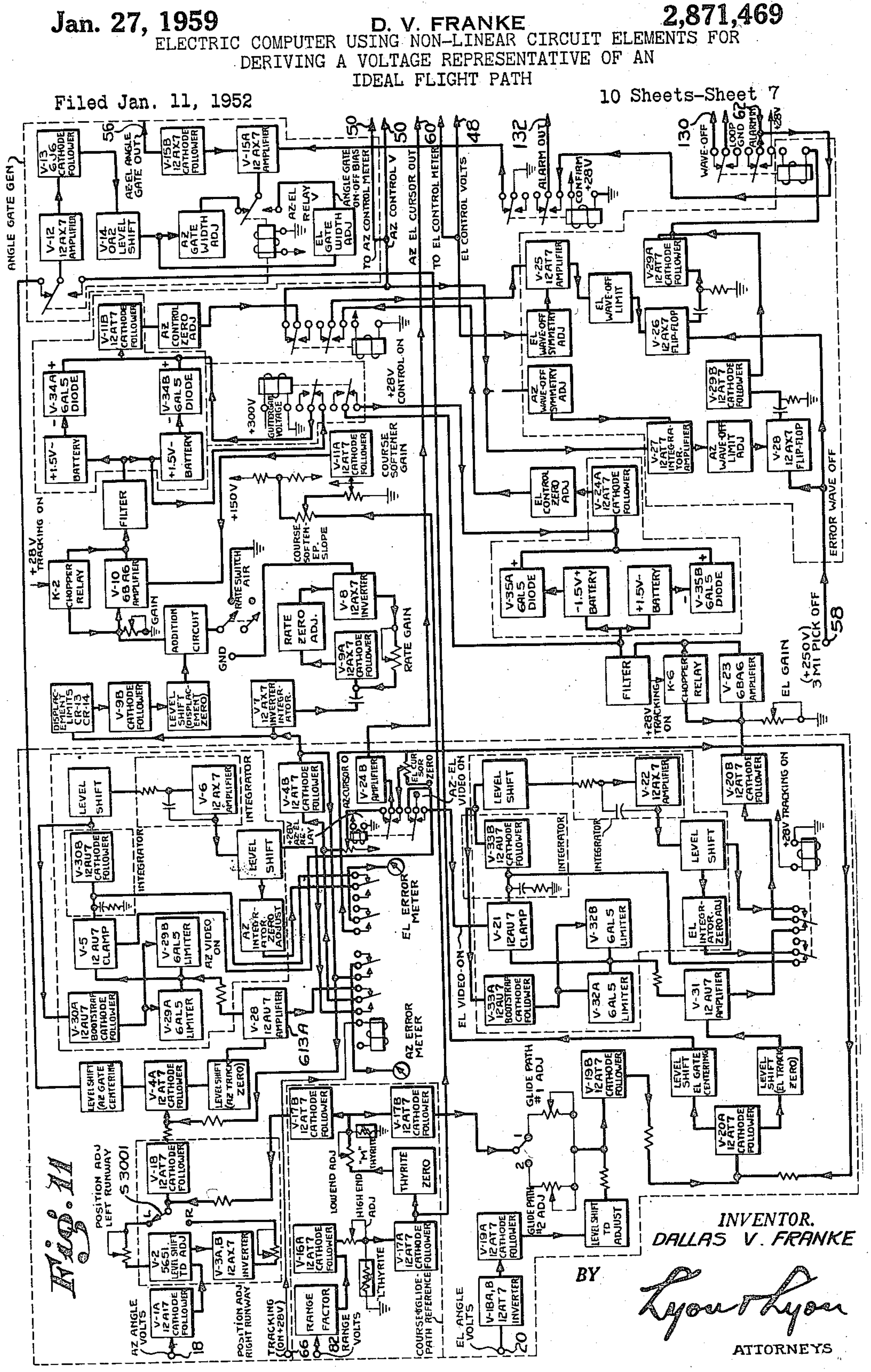

Figures 10A and 10B, interconnected as illustrated, constitute Figure 10, which is a schematic representation of the apparatus in the angle tracking and computer unit illustrated as such in Figure 7, such circuitry of Figures 10A, 10B being illustrated also in block diagram form in Figure 11.

Figure 12:
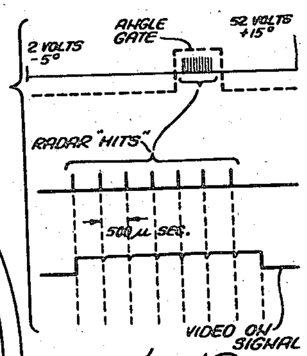

Figure 12 illustrates the character of the "stretched" video or video "on" signal, such signal constituting in general an elongated wave having a time duration equal to the time during which radar "hits" are being made on an aircraft plus a fixed time interval in the order of 500 microseconds.

Figures 13, 14:
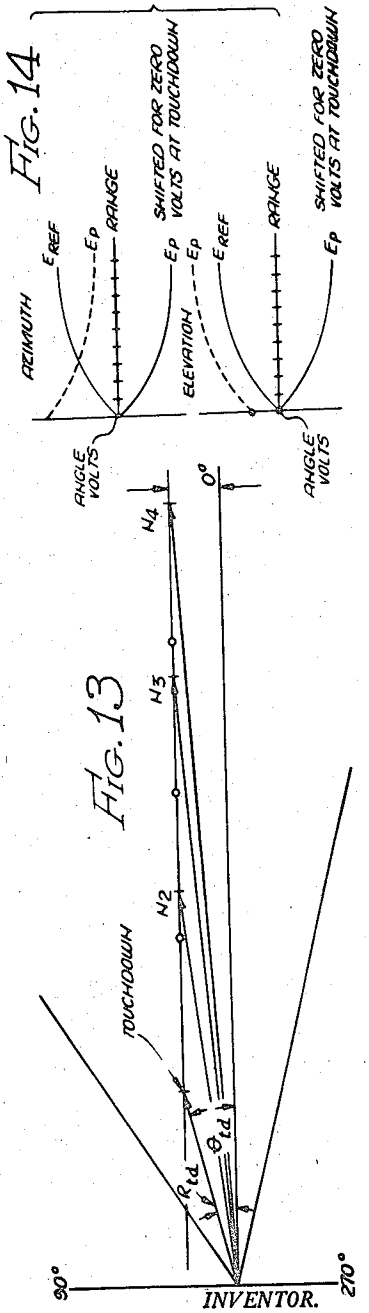

Figure 13 illustrates the geometrical conditions existing in the azimuth plane, with the radar equipment located adjacent the runway center line and in relationship to the touchdown point, such figure being useful in appreciating features of the computer illustrated in Figures 10A, 10B and 11.

Figure 14 is useful in explaining the manner in which the azimuth and elevation beam angle voltages are modified as a function of range for purposes of comparison with a reference voltage developed in the computer unit.

Figure 15:
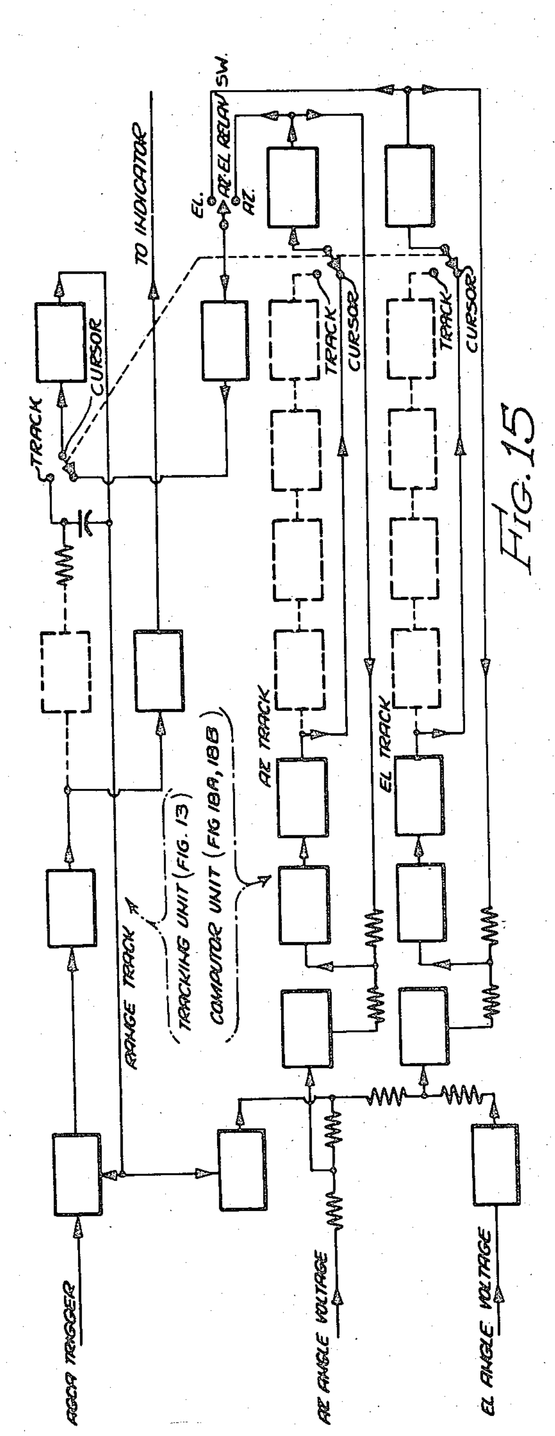

Figure 15 illustrates the manner in which the circuitry in the tracking unit and computer unit is modified so as to provide a visual reproduction on the cathode ray tube of both the azimuth course line and elevation glidepath, which are computed by using thyrite elements in the normal operation of the computer unit.

Figure 6:
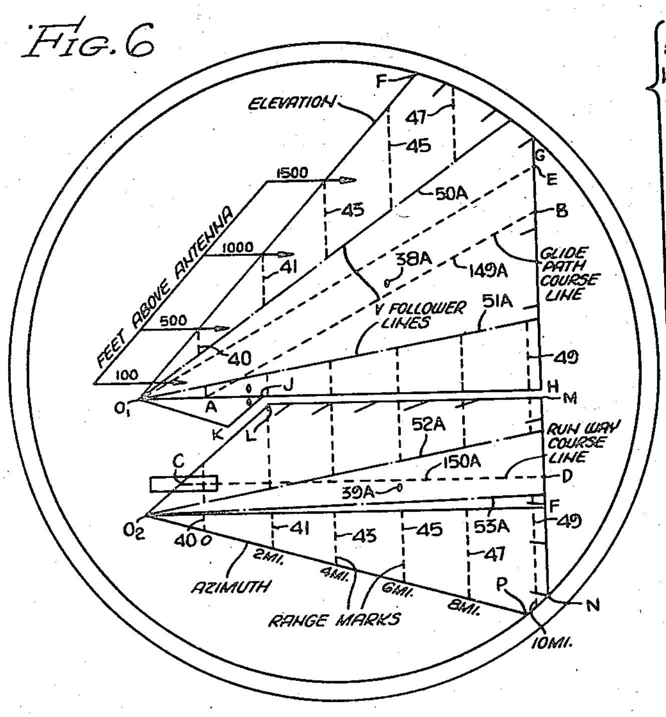
Figure 6 illustrates the display obtained using the apparatus illustrated in Figure 1, the elevation and azimuth displays being produced sequentially on a time sharing basis.
Figure 16:
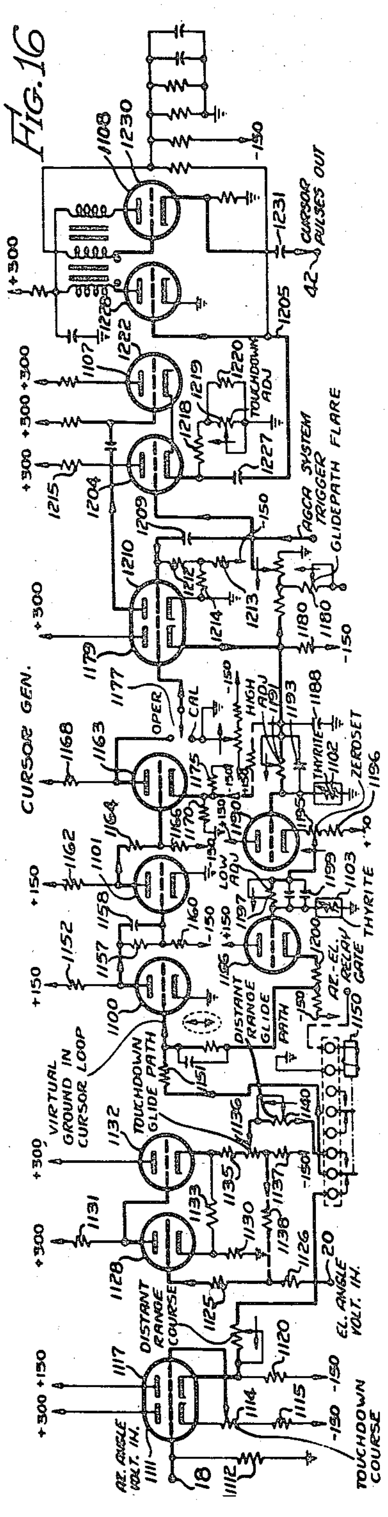
Figure 17:
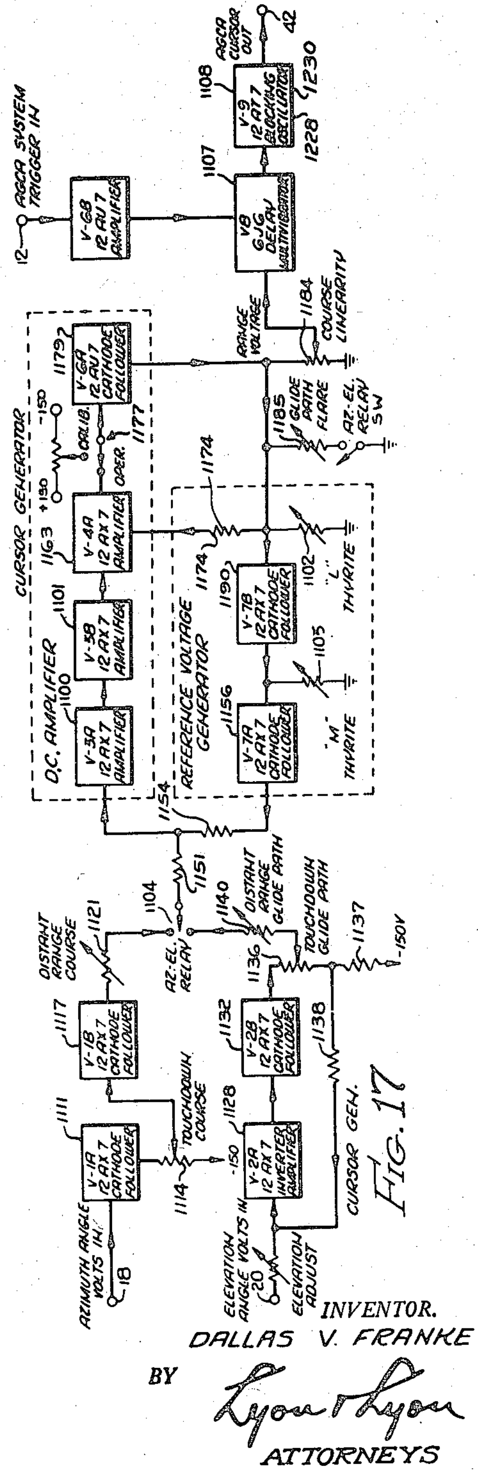

Figure 16 illustrates in schematic form the circuitry of a cursor generator useful in the production of the glidepath course line and runway course line illustrated as such in Figure 6, such circuitry being illustrated in block diagram form in Figure 17.

Figure 17 represents in block diagram form circuitry of the cursor generator illustrated in schematic form in Figure 16 and incorporated in the unit designated "AGCA Cursor Generator and Artificial Aircraft" unit in Figure 7.

Figures 18, 19, 20, 21, 22:
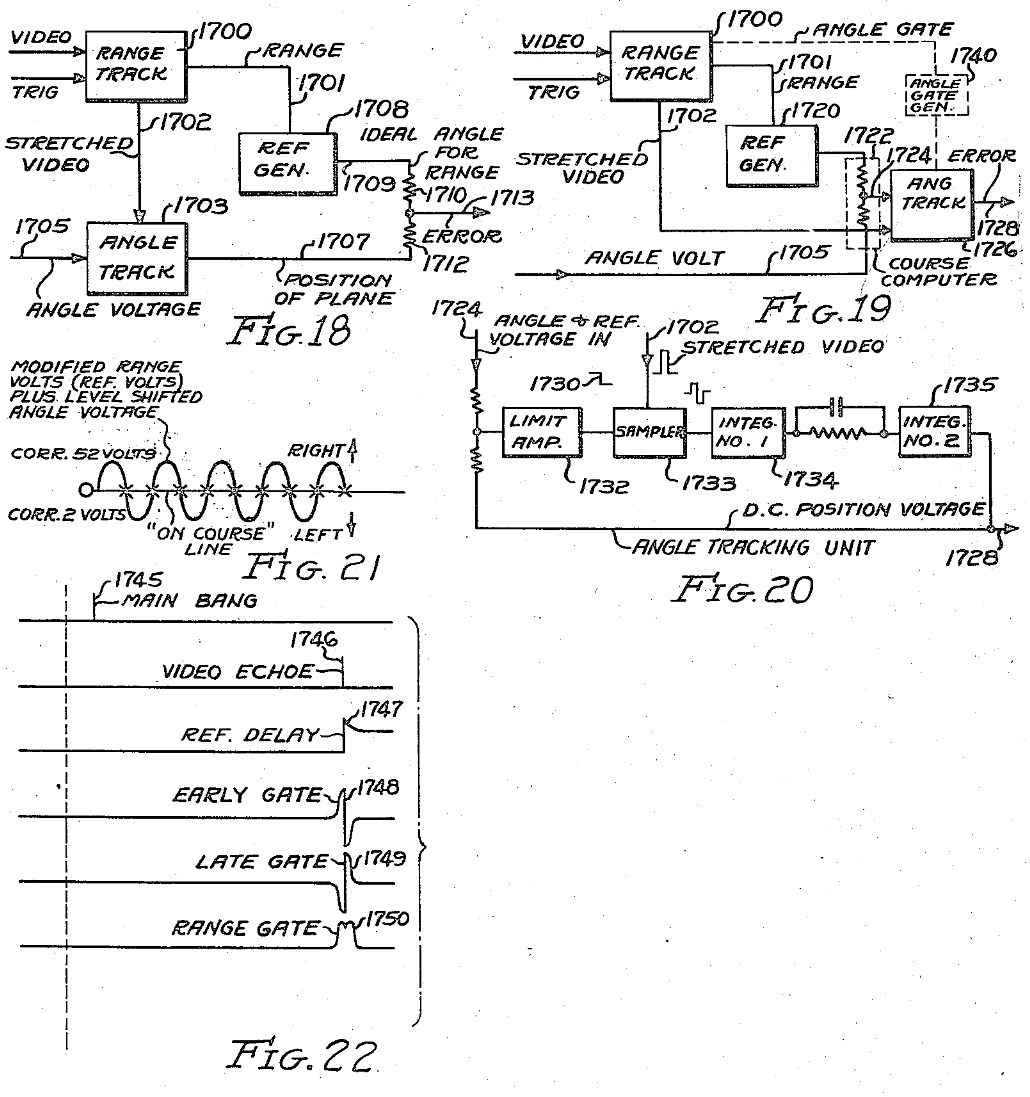

Figure 18 illustrates a modified arrangement and is useful in illustrating certain concepts present in the AGCA system.

Figure 19 is a block diagram similar to Figure 18 and serves to illustrate the functional relationship of certain units of the AGCA equipment.

Figure 20 shows in block diagram form certain circuitry of the computer unit illustrated in Figure 10B and is useful in illustrating the manner in which error tracking is accomplished, using a servo loop.

Figure 21 illustrates the type of voltage variation produced in the computing unit, the crossover points of which represent an ideal glidepath and course line.

Figure 22 is useful in illustrating the time sequence of certain control signals and gates and echoes in relationship to the main bang or transmitted pulse in the range tracking unit.

The computer incorporating important features of the present application is illustrated essentially with reference to Figures 10A and 10B, which together constitute Figure 10. However, before describing these figures in detail, the AGCA system is first described generally.

*Means shown in Figures 1–5 for producing information useful in producing visual indications*

Figures 1, 2, 3, 4, 5:
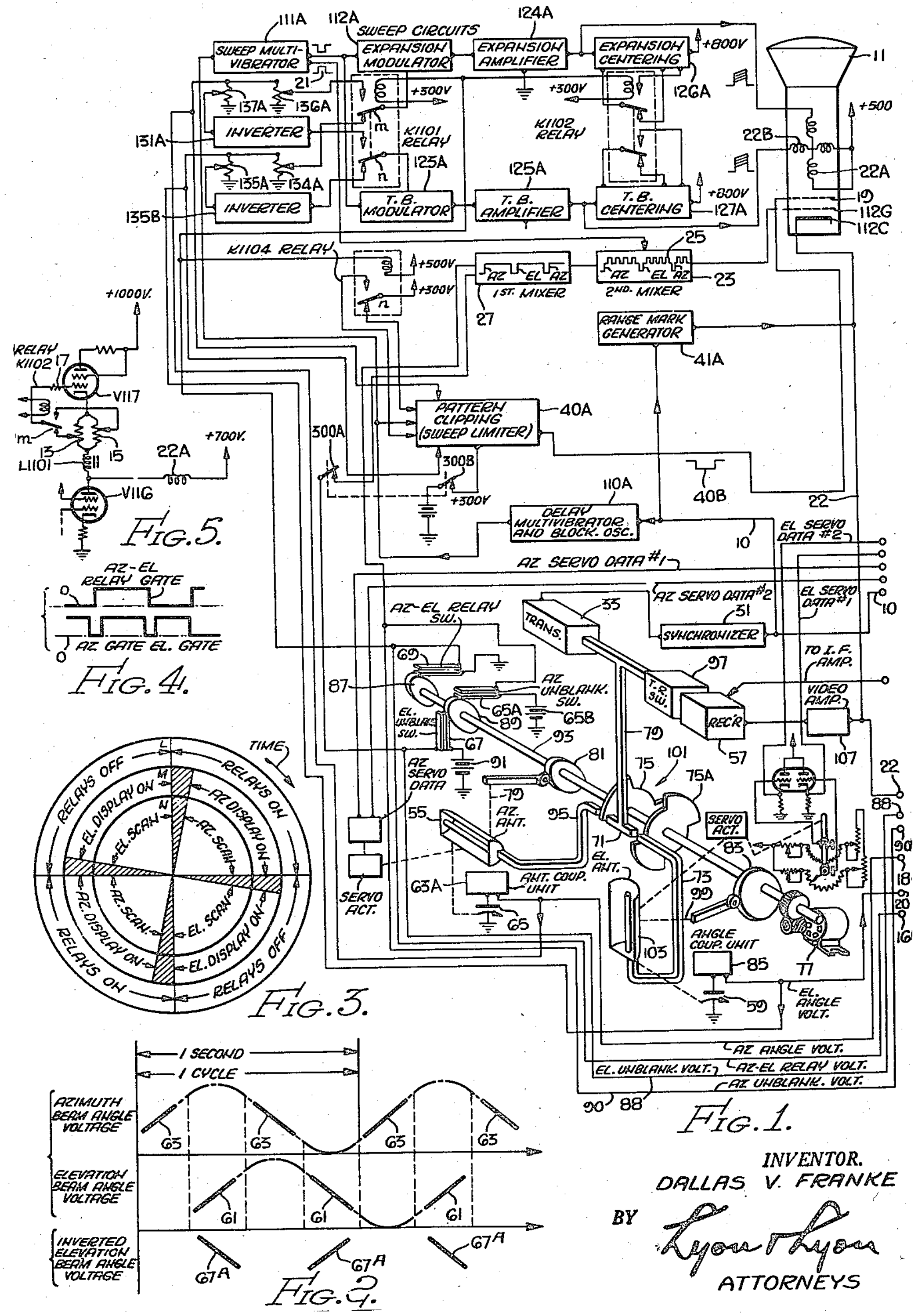
Figure 2 shows azimuth beam angle voltage, elevation beam angle voltage, as well as inverted elevation beam angle voltage, and their variations with respect to time as developed by the apparatus shown in Figure 1.
Figure 3 shows a cycle of operation of the radar scanning and indicating arrangements in Figure 1 and serves to illustrate the period during which the az-el relay voltage is available.
Figure 4 illustrates other voltages developed during cyclical operation of the apparatus illustrated in Figure 1.
Figure 5 illustrates more detail of the cathode beam centering means shown in block form in Figure 1, such circuitry being effective to shift the displays in Figure 6 sequentially from one origin position O–1 to the other origin position O–2 and from O–2 to O–1, etc.

The apparatus shown in Figure 1 is connected to the apparatus shown therein for producing visual indications on the face of a cathode ray tube 11 of the character shown in Figure 6.

In Figure 1, the synchronizer 31 serves to generate timing pulses which are used to time the application of pulses to the transmitter 33 to initiate its operation. The transmitter stage 33, pulsed at a constant repetition rate of, for example, 2000 or 5500 pulses per second, consists of, for example, a magnetron oscillator with a characteristic frequency of about 10,000 megacycles. The output of the transmitter stage 33 is transferred to either the elevation (el) antenna 103 or the azimuth (az) antenna 55, depending upon the position of the motor driven interrupter or radio frequency switch 101. The transmit-receive (TR) switch 97 prevents power from the transmitter 33 from being applied directly to the receiver 57. This transmit-receive switch 97, as is well known in the art, allows low intensity signals, such as a train of resulting echo signals received on the antennas 103, 55, to be transferred to the input terminals of the receiver 57. This deflection of energy from the transmitter 33 to the antennas 55, 103, accomplished by operation of switch 101, occurs at a rate of approximately two per second so that in effect the component antennas obtain four "looks" per second of the space scanned.

The resulting antenna beams are caused to move angularly, i. e., to scan upon rotation of the shaft 93. The switch 101 is rotated twice per second, and while energy is being transmitted to one of the antennas 55, 103, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, now U. S. Patent No. 2,596,113, issued May 13, 1952, for bridge type precision antenna structure, which depends for its operation on the use of a variable wave guide type of antenna. This particular means, per se, forms no part of the present invention, and, so far as the aspects of the present invention are concerned, the antenna scanning beam may be produced by moving the entire antenna through a relatively small arc of a circle. Actually, in fact the azimuth antenna beam may scan first in one direction and then in the other, waiting after each scan while the elevation beam completes a scan in elevation. The azimuth antenna 55 scans a fixed horizontal angle of 20°, and is so placed as to include the approach course to a given airfield runway. Vertical scan of the elevation antenna 103 is from minus one degree to plus 6 degrees.

While in any position during the part of the cycle in which the relay frequency switch 101 allows the flow of energy into the elevation antenna 103, the elevation antenna beam is electrically scanned in elevation. The position of the elevation antenna beam is measured by means of a variable capacitor 59, one plate of which is attached to the beam scanner of elevation antenna 103 and varied in accordance therewith, such capacitor 59 comprising one part of a capacitive potentiometer and contained in the angle coupling unit 85 which may be of the type described and claimed in the copending patent application of Clarence V. Crane, Serial No. 212,114, filed February 21, 1951, now U. S. Patent No. 2,650,358, issued August 25, 1953. The angle coupling unit 85 thus used with capacitor 59 is useful in developing the elevation beam voltage represented as 61 in Figure 2.

Similarly, the angle in azimuth of the radiated azimuth antenna beam is measured by the angle capacitor 65 in the azimuth angle coupling unit 63A, operating synchronously with the scanner of the azimuth antenna 55. Such variation in azimuth angle voltage as a function of the particular angular position of the azimuth antenna beam is represented by cyclically varying voltage 63 shown in Figure 2. It is observed that these voltage variations 61 and 63 have portions thereof shown in heavy lines, and it is these portions which are used to effect control operations and which are selected by means mentioned later. Figure 2 also shows inverted azimuth elevation beam angle voltage as represented by the oblique lines 67A.

Also coupled to the scanner of the elevation antenna 103 is the elevation unblanking switch 67, which has one of its terminals connected to the continuous voltage source 91 for purposes of developing an elevation unblanking voltage gate, shown in Figure 4, so timed that its positive value corresponds to the time of effective scanning of the elevation antenna beam. The azimuth unblanking switch 65A is similarly coupled to the scanner of azimuth antenna 55 with one of its terminals connected to the continuous voltage source 65B for purposes of developing azimuth unblanking voltage (Fig. 4) so timed that the positive portion of such voltage corresponds to the time of effective scanning of the azimuth antenna beam. Relay switch 69 operates at substantially the same time as switch 65A, and synchronously therewith, and serves to generate the so-called az-el relay voltage or gate (Fig. 4), which is so timed that its positive portion begins at a time just prior to the beginning of the azimuth unblanking voltage and just after the end of elevation unblanking voltage, and which ends at a time just after the ending of the azimuth unblanking voltage and just prior to the beginnning of the elevation unblanking voltage, all as seen in Figure 4.

Figure 3 shows a schematic diagram of the time relations involved in a scanning action which, typically, occupies a time in the order of one second. Forward progress of time is represented by clockwise motion about this diagram. The central circular region of Figure 3 marked N shows the time schedule of the scanning operations of the two systems, opposite quadratures being scanned by the same system but carried out in opposite directions. The shaded areas (each comprising approximately 10 degrees of the complete 360 degree cycle) represent the periods during which the transmitter 33 is switched by the switch 101 in Figure 1 from one antenna to the other antenna. Unshaded areas of region N represent the time periods during which one or the other of the antennas is in use, sending out radio frequency pulses and received reflected echo signals from objects within the field of coverage of the beam. Shaded areas indicate inactive periods during which switching takes place, both antennas being momentarily isolated from the transmitter and receiver.

The inner annular region M of Figure 3 represents the time schedule of the related azimuth and elevation displays, subject however to pattern clipping described later, and corresponds to the cyclical variations of azimuth and elevation voltages represented in Figure 2.

The outer annular region of Figure 3, marked L, shows the time schedule of currents through the various coils of a number of so-called az-el switching relays for effecting time sharing. The relay actuating current is obtained by the switch 69 (Fig. 2) operating in synchronism with the mechanism producing azimuth antenna beam scanning.

More specifically, in Figure 1, the wave guide transmission line 79 leads from the transmitter 33 and receiving system 97, 57. A T-joint 71 divides this transmission line into two branches 73 and 95, leading through switch assembly 101 to the elevation and azimuth assemblies 103 and 55, respectively. These branches have suitably placed shutter slots which receive the rotating shutters 75 and 75A, respectively. These are mounted on the common drive shaft 93, driven by the motor 77, and have two blades each arranged in opposite fashion, so that when one antenna transmission branch is opened, the other will be blocked by its shutter. The shutter blades cover angles of approximately 100°, leaving openings of 80° as required by region N of Figure 3.

As mentioned previously, the same drive shaft 93 operates the two antenna beam scanning mechanisms represented by the dotted lines 99, 79, and assumed to be of the same construction as the above-mentioned Allebach application and built into the antenna assemblies. In the showing of Figure 1, the eccentric cams 83, 81 on shaft 93 operate the same scanning mechanism. Since each of the cams 83, 81 has one lobe, while its associated shutter 75A or 75 has two lobes, one opening in the shutter will find the antenna scanning in one direction, the other in the opposite direction. The azimuth and elevation unblanking switches 75A and 67 are shown schematically in Figure 1 as being cam actuated, being operated by the two-lobed cam 89, for purposes of establishing the unblanking or intensifying voltages represented in Figure 4.

The az-el relay switch 69 is operated by the cam 87 on shaft 93 to control current to the circuit switching relays, the junction of which is described hereinafter.

Radar echo signals, when received at the elevation antenna 103 or the azimuth antenna 55, as the case may be, are fed back into the switch 101 and passed through the TR switch 97 into the receiver 57. Receiver 57 serves to detect the video and after the video is amplified in the video amplifier stage 107, it is applied as so-called normal video to the correspondingly designated leads 22 in both Figures 2 and 7. Such video, i. e., radar video, derived from echo signals may be applied directly to the cathode of the cathode ray tube 11 shown in Figure 1 for purposes of producing visual indications; or, such normal video may first be "standardized" by applying the same to the video shaper indicated as such in the block diagram shown in Figure 7. It is understood that other means may be used for applying the video to an intensity control electrode of a cathode ray tube and by, for example, the means and techniques described and claimed in the copending application of Landee et al., Serial No. 247,616, filed September 21, 1951, now U. S. Patent No.

2,796,603, issued June 18 1957, and assigned to the same assignee.

The cathode ray tube 11 in Figure 1 has a pair of magnetic deflection coils 22B, 22A, so arranged as to deflect the associated electronic beam substantially parallel to two mutually perpendicular axes, i. e., the so-called "time base" axis which is generally, although not exactly, horizontal as viewed by the operator, and the so-called "expansion" axis which is generally vertical. In general, each basic trigger pulse developed in synchronizer 31 is made to initiate a current wave of sawtooth form through the time base deflection coil 22B and a current wave of similar form through the associated expansion deflection coil 22A, the current in each coil expanding approximately linearly with time and then returning rapidly to zero. Instead of a linear variation, this variation may be logarithmic in character as described in the copending application of Homer G. Tasker, Serial No. 175,168, filed July 21, 1950, now U. S. Patent No. 2,737,654 issued March 6, 1956, and assigned to the same assignee as the present application.

The resulting rate of such sawtoothed current is of course the same as, or a fractional multiple of, the pulse repetition rate of the transmitted radar pulses and occurs during the expectant period of resulting echo signals. It will be understood that electrostatic deflection of the cathode ray beam may be used instead of electromagnetic deflection, appropriate modification being made in other parts of the equipment.

Such sawtooth currents applied to the deflection coils 22B, 22A, however, are "modulated" at a much lower rate by currents of much lower periodicity which are produced by the afore-mentioned beam angle voltages shown in Figure 2. Those portions of the voltage indicated in heavy lines in Figure 2 only are used to modulate the voltages on a time sharing basis.

*Purpose and function of apparatus*

The apparatus described herein combines the functions of (1) aircraft acquisition, (2) automatic tracking, and (3) error computation and control signal transmission.

The controlled aircraft is equipped with suitable radio equipment and an autopilot with automatic approach coupler. This equipment may be used as an automatic ground controlled approach system (AGCA) for the simultaneous guidance of two or more aircraft during their approach to a given runway adjacent to which radar equipment is located for scanning the approach zone.

The radar system incorporates two antennas, one for scanning the approach zone in a vertical plane, and the other antenna scanning the same approach zone in a horizontal plane. Vertical scan is from $-1°$ to $+6°$ while horizontal scan is in the order of 20°. In a system of this character, an approaching aircraft is first located by conventional search radar, using, for example, a plan position indicator (PPI) and is then directed by radio communication to the correct position for entry into a predetermined ideal glidepath (vertical plane) and course line (horizontal plane). The final approach along such ideal glidepath and course line is indicated upon the face of a cathode ray tube and the actual course of the aircraft is visually compared with that of an ideal approach, such ideal approach, i. e., ideal glidepath and ideal course line, being developed electronically by a so-called cursor generator.

In prior art systems of this character, radio communication is used to direct the aircraft along such ideal glidepaths and course lines; but in accordance with the present invention, means are provided for developing and transmitting to the aircraft control signals which are representative of the deviation of the aircraft from such glidepath and course line for purposes of maintaining, or tending to maintain, the flight of such aircraft along such glidepath and course line.

For accomplishing such automatic control of aircraft, the AGCA system described herein is such as to receive information from conventional GCA radar equipment relative to the range azimuth and elevation positions of the approaching aircraft and to compare these positions with an ideal predetermined glidepath. The result of this comparison, in the form of error signals, is electronically computed and automatically sent to the controlled aircraft via very high frequency radio communication. AGCA airborne equipment receives this information (correction signals) and interprets it in the form of control voltages, which are applied to the aircraft's autopilot approach coupler.

The range of this automatically controlled approach is from approximately 8 miles from the given landing field to a point of release from the system, known as touchdown. This point of release, or touchdown, is at an altitude of approximately 50 feet above the given landing strip, and at such a position of altitude that the pilot may assume control for the actual landing operation during the last few seconds of the landing.

Prior to the establishment of flight control of an approaching aircraft, communication between the AGCA installation and pilot of the incoming plane may be effected via a conventional transmitter receiving system in the V. H. F. band in the region of 140 megacycles.

Briefly, in operation of the AGCA system, the search radar operator, using the display of the conventional search radar (PPI), tracks the aircraft to a proper position altitude of the AGCA final approach. The entry into the AGCA system is along an "on course" approach line at a distance of approximately 10 miles and at an elevation of approximately 2800 feet above the airfield.

In the meantime, the radar equipment, being energized, is in its "search" function or condition in which a slow search sweep voltage is periodically developed for searching a radar echo from the approaching aircraft. As a matter of fact, coincidence of a radar echo from such aircraft with such slow search sweep voltage notifies the system of an approaching aircraft; and thereupon the tracking unit, illustrated in Figure 9, automatically switches from such "search" function or condition to a "track" condition and displays the range and speed of the incoming aircraft. Simultaneously, upon switching from such search to track function, the AGCA transmitter is turned "on" and a subcarrier on a transmitted wave, containing a so-called "channel select" key, is transmitted to the approaching aircraft. At a given range, or upon directions from the ground via conventional radio transmission, the pilot of the approaching aircraft renders effective his airborne decoder (signal data converter) by actuating a switch.

Actuation of such switch starts the search drive motor of the airborne decoder, and the output of the AGCA airborne receiver is searched for an AGCA subcarrier. At intervals of 25 seconds, the AGCA ground transmitter is automatically interrupted for a one-second period. This interruption constitutes "interrogation."

If upon the "interrogation" the airborne decoder has located the transmitted subcarrier, the signal interruption causes the detector to send a 4500 cycle per second "confirmation signal to the ground via the airborne transmitter. This "confirmation" signal is received by the AGCA receiver and serves to energize relay windings to apply a +28 volt so-called "control" signal to a common bus of the ground equipment.

Figure 9:
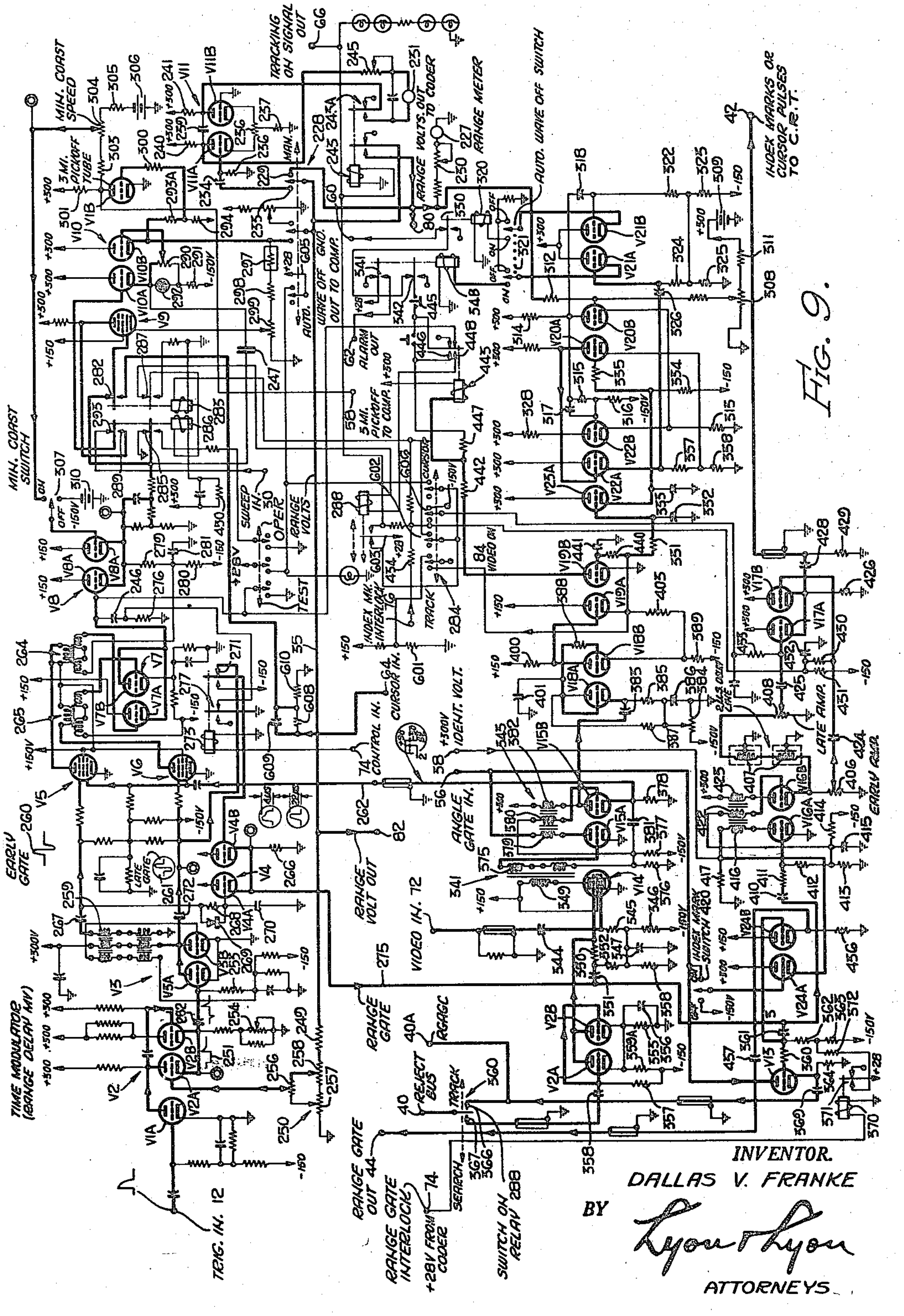
Figure 9 represents in schematic form the circuitry of the AGCA tracking unit illustrated in Figures 7 and 8.

At the time the range tracking unit in Figure 9 automatically switches from its "search" function to its "track" function as described above, a so-called tracking "on" signal developed in the range tracking unit is applied to the computer unit illustrated in Figures 10A and 10B, so that a computer unit is conditioned to compute the error, if any, of the aircraft from the ideal glidepath and ideal course line.

Upon development of the confirmation control signal resulting from confirmation, the AGCA transmitter is turned on to transmit to the aircraft the error signals computed by the unit shown in Figures 10A and 10B, as well as certain other information. Such error signals, i. e., azimuth and elevation control signals, as well as a signal representative of the instantaneous range of the aircraft, is used to modulate the subcarrier transmitted to the aircraft, to provide the autopilot with correction signals for "on" course approach and providing the pilot with visual display instantaneous range from touchdown information.

The data, including control signals for effecting flight of the aircraft, as well as other control signals, are transmitted from the ground to the aircraft by the use of a subcarrier on the transmitted wave.

The AGCA system incorporates means shown in Figures 10A, 10B for generating an alternating voltage representing at the zero voltage cross-over points an "ideal" glidepath and "ideal" course line, which are so adjusted to coincide with an actual physical ideal approach to a given airfield. This glidepath and course line thus generated for the primary purpose of developing control signals for controlling the flight of an aircraft both in elevation and in azimuth, may be checked visually on the face of a cathode ray tube upon rearrangement of the circuitry used in accomplishing the primary function of developing control signals.

*Brief description of range and angle tracking circuits with respect to Figures 18, 19, 20, 21 and 22*

In ascertaining the position of an aircraft with respect to a predetermined glidepath, certain concepts are embodied herein which are exemplified in connection with Figures 18 and 27. In this respect, Figure 26 illustrates a theoretical approach to the solution of this problem, while Figure 19 represents the circuitry as actually described in detail herein, the arrangement in Figure 19 being preferred particularly since it conveniently allows the development of an angle gate.

In Figure 18, range tracking of the aircraft is obtained using circuitry in the range tracking unit 1700, such unit 1700 being supplied with radar video, i. e., echoes and triggering pulses which are developed in timed relationship with respect to the transmission of pulsed energy to the aircraft; and such unit 1700 develops a voltage on lead 1701 representative of the range of the aircraft as well as a so-called stretched video signal on lead 1702, such stretched video signal being transmitted to the angle tracking circuit 1703 so as to render such unit 1703 sensitive or effective only during the period of such stretched video, i. e., the time during which radar echoes are being received. This stretched video developed on lead 1702 is compared, in time, with the antenna beam angle voltage supplied over lead 1705 to the angle tracking unit 1703; and as a result of the comparison of the stretched video signal with the angle voltage, a voltage is developed on lead 1707 representative of the actual position of the aircraft or plane. This voltage on lead 1707 representative of the actual position of the aircraft is compared with a second voltage developed in the reference generator 1708, such second voltage being applied to lead 1709, and being representative of the position of an aircraft flying "on course" along a predetermined glidepath or course line, as the case may be.

These two voltages developed on leads 1707 and 1709 are compared in a differential network including resistances 1710 and 1712, so as to develop a differential voltage on 1713, such different voltage constituting the so-called error voltage and representing the deviation of the tracked aircraft from such predetermined glidepath or course line.

For this aforementioned purpose, the stretched video on lead 1702 serves to gate the angle tracking circuit 1703, so that angle voltage appears on lead 1707 only during the reception period of echoes.

Inasmuch as the radar equipment is located adjacent the aircraft landing field and not at touchdown, certain corrections are required in accordance with principles described in connection with Figure 13, such correction being supplied by the reference generator stage 1708, which may be considered to generate an ideal angle voltage in accordance with the particular value of range voltage appearing on lead 1701.

The error voltage developed on lead 1713 serves to modulate a transmitter for transmitting correction signals to the aircraft.

In the arrangement shown in Figure 19, which is more representative of the actual circuitry described herein, the range tracking unit 1700 supplied with video and system triggers develops on lead 1701 a voltage representative of the range of the aircraft and develops on lead 1702 a stretched video signal of the character illustrated in Figure 12. The range voltage is supplied to the reference generator 1720 which feeds a voltage to the so-called course computer unit 1722 to which is supplied also either azimuth or elevation antenna beam angle voltage, as the case may be at that particular instant.

The course computer 1722 serves to develop a predetermined glidepath or course line, as the case may be, such glidepath or course line being determined by the crossover points (indicated by "$x$" marks), of an alternating voltage of the character represented in Figure 21. A line passing through these "$x$" marks in Figure 21 establishes a so-called "on course" line. The alternating voltage of the character shown in Figure 21 appears on lead 1724 in both Figures 19 and 20 and is applied to an angle tracking unit 1726 for purposes of developing an error voltage on the output lead 1728, which is representative of the deviation of the aircraft from its on course position.

The angle tracking circuit 1726 is gated to receive incoming information only during the period of the stretched video gate transferred over lead 1702. The angle tracking unit described in detail herein and represented in block diagram form as unit 1726 in Figure 19, is illustrated in Figure 20.

The angle tracking circuit constitutes a servo loop in which a unidirectional feedback voltage developed on lead 1728 serves as an indication of the deviation of the tracked aircraft from the predetermined glidepath or course line. The error voltage developed on lead 1728 is used to modulate a transmitter for transmitting correction signals, so that the aircraft is caused to fly, or tends to fly, along such predetermined glidepath or course line.

In this respect, while the angle tracking unit as such constitutes a servo loop, such servo loop forms a part of a second servo loop; such second servo loop, constitutes the angle tracking unit supplying information to the aircraft via the ground to air data link, the radar link between the aircraft and the radar installation, and the radar installation in turn, supplying information to the angle tracking unit.

Returning to the servo loop illustrated in Figure 20, the alternating voltage of the character illustrated in Figure 21 is sampled at the time of the stretched video on signal developed on lead 1702. In general, at coincidence of the stretched video on signal with a crossover point of the alternating voltage illustrated in Figure 21, a zero error voltage is developed on lead 1728 indicating that the aircraft is flying on course; if, at the time of the stretched video on signal, the aircraft is flying to the right of the on course line, a positive voltage is developed on lead 1728; and if, at the time of the stretched video signal, the aircraft is flying to the left of the on course line, a negative voltage is developed on lead 1728.

The angle tracking unit illustrated in Figure 20 constitutes a closed electronic servo loop with a unique configuration of samplers and integrators, in which a step function 1730 is developed at the time of each crossover point in Figure 21. This step function 1730 supplied through the limit amplifier 1732 to the sampler 1733 is compared with the stretched video supplied to such sampler 1733. The stretched video signal gates the sampler 1733 so as to cause admission of a positive charge to the first integrator stage 1734 during the time that the video occurs on the high side of the step and a negative charge during the time that video occurs on the low side of the step.

The first integrator stage 1734 integrates the areas under the positive and negative portions of the video envelope, and if any asymmetry exists, the output of the integrator stage 1734 is other than zero, i. e., either positive or negative, causing the second integrator stage 1734 to act in such a way as to center the step 1730 on the stretched video signal or envelope.

The use of double integration provided by stages 1734 and 1735 results in velocity memory in angle tracking, since the output of the first integrator 1735, 1734 is a voltage representing the angular position of the aircraft, and in the absence of video signals, this voltage does not change.

Another important feature of the angle error tracking circuitry illustrated in Figure 20 is that the vertical line of the step function 1730 is automatically centered with respect to the stretched video envelope thereby assuring weighing of all radar hits which constitute the stretched video envelope, it being remembered that the stretched video envelope is of the character illustrated in Figure 12. By thus giving weight to all radar hits, the effective center of the aircraft is established with respect to the predetermined glidepath or course line.

For purposes of assuring range tracking of aircraft appearing on or immediately adjacent the position of the tracked aircraft, the video supplied to the range tracking unit 1700 (Figure 19) is angle gated, i. e., such video is allowed to have its effect on the range tracking unit 1700 only during a relatively short interval when radar hits are being expected from an aircraft being tracked.

For that purpose an angle gate generator 1740 (Figure 19) is provided for developing angle gates substantially at the time the antenna beam crosses the aircraft.

In Figure 22, pulses corresponding to the periodic transmission of energy are represented at 1745 as "main bangs." The resulting video echoes of an aircraft flying on or adjacent to the on course line are represented at 1746. A reference delay voltage 1747 is developed in the range tracking unit 1700, by means described in detail elsewhere herein, for tracking such video signal 1746, i. e., for producing range tracking.

As a result of coincidence between the video echo 1746 and delay voltage 1747, the bipolar early and late gates 1748 and 1749 respectively are developed in the range tracking unit 1700. The positive portions of the gates 1748, 1749 are effectively added to produce the range gate 1750.

Figure 8:
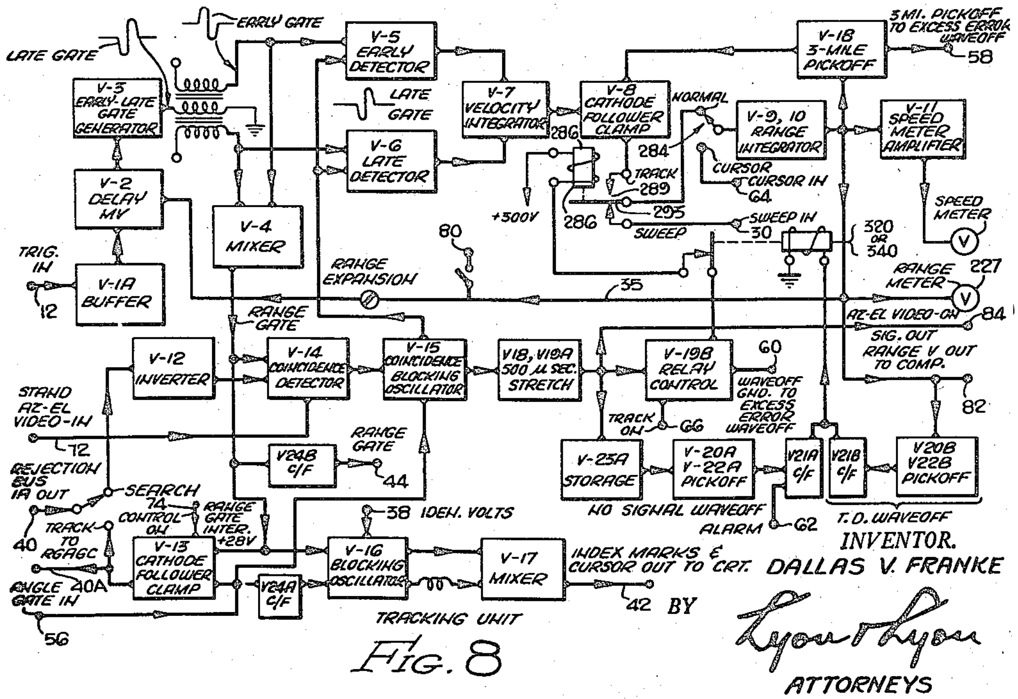
Figure 8 illustrates in block diagram form the circuitry of the AGCA tracking unit indicated as such in Figure 7, such circuitry being illustrated in detail in Figure 9.

Range tracking is accomplished by the AGCA tracking unit, shown in Figures 8 and 9, which constantly revises the delay of a range rate in such a manner that it encompasses the video envelope of a tracked aircraft. Tracking results in the generation of a range voltage ($\varphi$) directly proportional to the delay, or range, of the radar target echo with relation to the touchdown point.

A second output of the range tracking unit is stretched video shown in Figure 12, a gate of fixed amplitude, enduring for the time required for the radar scan to cross the tracked target, plus a fixed period of 500 microseconds. The extension of stretched video throughout the AGCA system is known as the "video on" signal.

With respect to the reference computer, details of which are shown in Figure 10A, assuming that for the small angles scanned in the AGCA approach area the value of the sine of the angle is approximately equal to the angle expressed in radians, it may be shown that, assuming a touchdown angular position voltage as a reference of zero volts, the correct position angle voltage for any range is found by the general equation $$E_r = K(1-1/n)$$

where K is an arbitrary constant and "$n$" is a factor expressing the range of the aircraft from touchdown divided by the range from the equipment to touchdown. The function, therefore, of the reference computer, is the translation of the range voltage ($\varphi$) to a reference voltage, $f(r)$, which, when added to a suitably shifted azimuth or elevation angle voltage, as the case may be, will result in a voltage of zero when the antenna is at the angle equal to the corresponding azimuth or elevation position of an aircraft "on course" for any given range (zero to ten miles). The input to the reference computer, therefore, is the range voltage ($\varphi$) generated in the tracking unit. The output of the reference computer is a general function of this input, following the equation $f(R) = K(1-1/n)$.

The function of the course computer, details of which are shown in Figure 10A, is the inversion of elevation angle voltage, and the addition of level shifted elevation and azimuth angle voltages to the reference voltage. The output of the course computer is a pair of composite angle and reference signals whose value at the instant that the "video on" signal occurs denotes the error of the tracked aircraft from course or glidepath, i. e., error in azimuth or elevation, as the case may be. One of this pair of signals, i. e., the azimuth signal, is out of phase with the elevation signal and both such signals vary cyclically at approximately 2 cycles per second.

The azimuth and elevation angle tracking circuits respectively each incorporate a substantially identical closed servo loop which is shown in detail in Figure 10A and which is arranged in such a way as to measure the amount by which the input signal deviates from zero at the time of the video on signal is supplied thereto. As explained more fully elsewhere, this constitutes a measure of the angular deviation of the aircraft from a predetermined course or glidepath. In the azimuth tracking circuit, the position error determined by the loop is compared with the composite output of the course computer at the time for the video on signal. If the values are equal, the video on signal is bisected by a step voltage and no loop error exists. Hence the course error of the aircraft has been correctly found. If the step voltage does not bisect the video on signal, a loop error is sensed, which, acting upon the integrators, causes the error voltage output to change in such a manner as to make the step bisect the video on signal and make the output correctly describe the error of the plane from course. The output of the tracking circuits appears respectively as continuous voltages representing the position errors of the tracked aircraft in azimuth and elevation respectively.

*Description of range tracking unit illustrated in Figures 7, 8 and 9*

The range tracking unit illustrated in block diagram form and in schematic form respectively, in Figures 8 and 9, incorporates a servo loop functioning to cause tracking of an aircraft in range, such servo loop serving to develop certain control voltages for purposes of angle tracking computation, as well as for producing other control effects.

The input to the range unit includes:

(1) Video over lead 72;

(2) System triggers over lead 12;

(3) The sawtooth voltage wave over lead 30, such sawtooth wave, however, being effective only during the "search" function of the equipment;

(4) An angle gating voltage supplied to the tracking unit over lead 56 from the computer unit, such angle gating voltage serving in general to limit the time during which the range tracking unit responds to incoming video. This angle gating voltage may be considered as being the result of range and angle tracking and not a means for range or angle tracking and is illustrated in Figure 12;

(5) A "control on" signal developed in the coder unit and transferred over lead 74 is for control purposes. This control on signal and other input voltages enumerated below as input signals are in the form of control signals for the range tracking unit described under this heading.

Briefly, the control on signal, transferred over lead 74, is the result of "confirmation," i. e., an acknowledgment by an incoming aircraft that it is conditioned for reception of control signals which are thereafter transmitted from the ground to the aircraft for automatically controlling the flight of the same;

(6) Identification voltages transferred over lead 38; such identification voltages when applied by manually operating a switch on the control panel serving to override the angle gates applied to lead 56, i. e., when identification voltage is present on the lead 38, the index marks developed in the range tracking unit are not limited to the short duration of the angle gate voltages;

(7) Warning and wave off interlocking voltages are transferred over lead 78 from the coder unit. For purposes of describing the range tracking unit, continuous 28 volts may be assumed to be present on lead 78;

(8) Index mark interlocking voltages are transferred from the coder unit over lead 76;

(9) The rejection bus 40 is connected between identical elements of different range tracking units in a multiplane landing system and the signals on this bus 40 may be considered either incoming signals or outgoing signals depending upon the relative positions of aircraft being tracked by the two interconnected range tracking units;

(10) The lead 64, during "cursor" operation, serves to convey cursor signals from the computer unit to the range tracking unit.

The output signals from the range tracking unit are:

(1) Range voltage appears on lead 82 and the magnitude of such voltage serves as a measure of the range of the tracked aircraft;

(2) A "stretched" video signal is developed on lead 84 and serves to control other related units during that portion of the antenna beam scanning period when radar "hits" are being made on the incoming aircraft;

(3) A range voltage is also developed on lead 80 for control purposes only and is applied to the coder, such range voltage varying as the range voltage on lead 82, but being of smaller magnitude. This range voltage on lead 80 is used for transmitting to the incoming aircraft information as to its range from touchdown;

(4) Index marks or cursor pulses, as the case may be, appear on the output lead 42, such index marks being applied to an intensity control electrode of a cathode ray tube and constituting a pair of time spaced marks which bracket the image of the aircraft on the cathode ray tube screen for purposes of identification;

(5) A so-called "3-mile pick off" signal appears on lead 58 only when the tracked aircraft is within three miles of touchdown, such pickoff signal being used for control purposes in the excess error wave off portion of the computer unit. This signal, as well as the other output signals enumerated below, is in the form of a control signal;

(6) A so-called range gate appears on lead 44 and is applied to the overtake warning and wave off unit, as well as to "gating central";

(7) A wave off signal is developed on lead 60;

(8) A "tracking on" signal is developed on lead 66 and applied to the computer unit and coder unit for purposes of conveying information to those units to the effect that the range tracking unit is changed from its "search" function to its "track" function;

(9) An alarm signal is developed on lead 62 to convey information as to loss of video.

In general, the range tracking unit includes a servo loop. The servo loop includes the multivibrator stage V2; the early-late gate generator V3 in the form of a blocking oscillator stage; the early-late gate detector stages V5 and V6; the differential integrator stage V7; the cathode follower clamp stage V8; the range integrator stage V9, V10; and the lead 35 extending from the stage V10 to the multivibrator stage V2 completes the loop. The voltage on such lead 35 is termed the "range voltage" and is a measure of the range of the tracked aircraft, when such aircraft is being tracked. The voltage on this lead 35 may be measured on the volt meter 227, i. e., the range meter 227, when the relay 243 is energized.

In order to obtain an indication of the speed of the tracked aircraft on the speed volt meter 231, such volt meter 231 is coupled to the lead 35 through a differentiating nework and D.-C. amplifier which includes the tube V11. For that purpose, in the automatic position of switch 228, the lead 35 is coupled to the control grid of tube V–11A through the stationary contact 233 and differentiating network, such differentiating network including the condenser 234 and resistance 235.

The cathodes of tubes V–11A and V–11B are interconnected by means of potentiometer resistance 236 which has its adjustable tap returned to ground through resistance 237. The anodes of tubes V–11A and V–11B are interconnected by means of condenser 239 and are supplied with space current from a 300 volt source through resistances 240 and 241, respectively. The control grid of tube V–11B is grounded. The voltage developed between the anodes of tubes V–11A and V–11B, i. e., across condenser 239, is applied to opposite terminals of the speed volt meter 231. It is noted that the relay 243 is energized in the track function of the unit and is de-energized in the search function of the unit. In the track function the speed is indicated by meter 231; but such meter is disconnected in the search function to avoid damage to the meter inasmuch as searching occurs at a rate comparable to 3,000 miles per hour. It is observed that for this purpose one terminal of the meter 231 is serially connected with the adjustable resistance 245 to the anode of tube V–11A; while the other terminal of meter 231 is connectible through the relay switch 243A to the anode of tube V–11B.

The abovementioned servo loop includes two integrator circuits which include respectively the condenser 246 and condenser 247, condenser 247 being associated with the range integrator stage V9, V10. The voltage developed on condenser 246 is a measure of the velocity of the tracked aircraft and voltage derived from such condenser 246 is integrated in the stage V9, V10 and applied as aircraft range voltage to the aforementioned lead 35.

The manner in which the so-called speed voltage appearing on condenser 246 is developed is now described in relationship to stages V–1A, V2, V3, V5, V6 and V7.

The system trigger, in the form of a positive pulse, is applied through lead 12 to the control grid of the buffer amplifier tube V–1A, and after amplification therein is applied as a negative pulse to the control grid of tube V–2B. The tubes V–2B and V–2A comprise a part of the multivibrator stage V2. It is observed that the tube V–2B, in its quiescent state, is highly conducting since a positive voltage appears a such time on its control grid. The cathodes of tubes V–2B and V–2A are interconnected so that in such quiescent state the cathode of tube V–2A is at a relatively high positive potential. The so-called range voltage appearing on lead 35 is applied through resistance 249 and through a voltage dividing network 250 to the control grid of tube V–2A.

The multivibrator stage V–2 serves to develop a negative-going gating voltage 251 on the cathode of tube V–2A, the duration of which varies in accordance with the magnitude of the voltage on lead 35. Such gating voltage is started upon appearance of the system trigger, in inverted form, to the control grid of tube V–2B. The multivibrator stage V2 is thus termed a timing modulator since it serves to develop a negative-going gate on the cathode of tube V–2B with a duration representative of the magnitude of the voltage appearing on the lead 35.

Such negative-going gating voltage 251 is differentiated by the differentiating network comprising condenser 252 and resistance 253, which are in the grid circuit of the blocking oscillator stage V–3. A positive pulse corresponding to the trailing edge of the negative-going gating voltage 251 is thus applied to the control grid of the trigger tube V–3A. Such positive pulse is, of course, delayed with respect to the system trigger in an amount corresponding to the duration of the negative-going gating voltage 251 developed in stage V–2. It is noted that the potentiometer resistance 254 is adjusted so that, with zero voltage applied to lead 35, a delay is interposed which corresponds to the aircraft touchdown position, while resistances 256, 257, 258 allow adjustment of the scale of the delay with respect to range voltage.

The blocking oscillator stage V–3 has two separate output circuits, one of which includes the transformer winding 259 for developing a so-called early gating voltage of gate 260. A late gate 261 is developed on the anode of tube V–3B. The first or "early" gate consists of a positive-going wave form 260 followed by a negative-going wave form and is applied to the suppressor grid of the early detector tube V–5. The second or "late" gate 261 consists of a negative-going wave followed by a positive-going wave form and is applied to the suppressor grid of the late detector tube V–6. These positive portions of the pulses 260, 261 produced by oscillator V–3 thus appear alternately in the suppressor grids of the early-late gate detectors V–5 and V–6 causing them to be placed in a condition that they may conduct when positive gated video signals are coincidently applied from lead 262 to the respective control grids of tubes V–5 and V–6. In other words, tubes V–5 and V–6 are essentially coincident tubes arranged to conduct only when there is a positive signal applied both to their control grids and suppressor grids.

The manner in which the video appearing on lead 262 is gated is described in detail hereinafter but, in general, such video, when it appears, preferably has a uniform height and a uniform width, so that in effect such video may be uniformly compared with the positive portions of the wave forms 260 and 261.

The signal passed by the early-late detectors V–5, V–6 is applied to the grids of differential integrator circuits consisting of two triode sections V–7A and V–7B of stage V–7.

It is observed that video signals corresponding with the positive-going portion of the early gate 260 are passed by tube V–5. Video signals corresponding with the positive-going portion of the late gate 261 are passed by tube V–6. The signal appearing on the anode of tube V–5 is applied through the pulse transformer 264 to the control grid of integrator tube V–7A so as to charge condenser 246. Video signals corresponding with the positive portion of the late gate 261 is passed by tube V–6 and applied by pulse transformer 265 to the control grid of the integrator tube V–7B, lowering the voltage on condenser 246. The combined effect, therefore, of the early-late gate detector circuitry is to charge condenser 246 when radar video corresponds with the early gate (indicating that the aircraft is moving forward at a rate greater than that of the range gate) and to discharge condenser 246 at the time of coincidence of video signal with the late gate (indicating that the gate is going forward at a greater rate than the aircraft). The combined output of tube V–7A and V–7B thus appearing across condenser 246 may be interpreted as a "speed" voltage for the tracked aircraft. It is noted that the range gate mentioned in the previous sentence is defined by the positive portions of the wave forms 260, 261, such positive portions being displaced, of course, along the time axis. This range gate is formed using the mixer stage V–4.

The mixer stage V–4 includes the two cathode follower tubes V–4A and V–4B, each of which have their cathodes returned to ground through the common load resistance 266. The control grid of tube V–4A is coupled through the parallel connected resistance 268 and rectifier 269, and serially connected condenser 267 to one terminal of the winding 259 to thereby receive the early gate voltages. The control grid of tube V–4A is returned to ground through condenser 270.

The control grid of tube V–4B is connected through the stationary relay contact 271 and condenser 272 to the anode of tube V–3B so as to receive the late gate when the relay 273 is de-energized as shown in Figure 9. It is noted that the relay 273 serves generally to narrow the range gate and to increase the time constant of the servo loop in the "control" function of the equipment, i. e., after the incoming aircraft has confirmed or acknowledged that it is in condition for reception of transmitted control signals; or, more specifically, while angle tracking is being accomplished. For that purpose, the relay 273 is energized by the "control on" signal applied to lead 74. With relay 273 energized, the control grid of V–4B is connected to a −150 volt source and is no longer receptive to the late gate; at the same time the resistance 276 is no longer short circuited by the relay switch 277, but such resistance 276 is then serially connected with the condenser 246. Thus with relay 273 energized, the range gate appearing on lead 262 has a time duration commensurate only with the time duration of the early gate and is substantially independent of the time duration of the late gate. As indicated in Figure 9, the range gate developed across resistance 266 has a time duration of approximately four microseconds in both the search and track functions of the equipment; but in the control function, the time duration is decreased to a value of approximately 2.2 microseconds. The manner in which the range gate thus developed on lead 275 is utilized is described in detail hereinafter.

As noted previously, a voltage representative of the speed of the aircraft is developed across condenser 246. The voltage appearing across condenser 246 produces a proportional voltage on the cathode of the cathode follower stage V–8.

Stage V–8 comprises tubes V–8A and V–8B, which have their cathodes interconnected and, in turn, connected to a −150 volt source through serially connected resistances 279 and 280, the junction point of which is bypassed to ground by means of condenser 281.

The voltage appearing on the cathodes of tubes V–8A, V–8B is applied to the control grid of the range integrator tube V–9 through the normally closed relay switch 282 of relay 283. It is noted that the relay 283 is shown in its de-energized condition which corresponds to the condition when the circuit is adjusted for automatic tracking. Relay 283 is energized only during the time the apparatus is conditioned for so-called cursor operation wherein the switch 284 is set to its "cursor" position, thus remaining de-energized in the normal operation of the tracking loop. It is observed that the control grid of tube V–9 is grounded by the normally closed relay switch 285 of relay 286. Relay 286 when de-energized as shown is in its search position; but such relay 286 is energized during the track function of the unit. Thus during the search function the control grid of tube V–9 is grounded; but during the track function the voltage developed on the cathodes of tubes V–8A, V–8B is applied to the control grid of tube V–9.

Thus, in automatic tracking, the speed voltage appearing on the cathodes of tubes V–8A, V–8B is applied to the control grid of the second integrator stage V–9, and the integrator output appears on the cathode of cathode follower stage V–10A. For that purpose, the anode of tube V–9 is conductively connected to the control grid of tube V–10A through the normally open relay switch 289 of relay 286. The cathode of tube V–10A is returned to the negative terminal of a −150 volt source through a serial circuit which includes potentiometer resistance 290 and fixed resistance 291. The resistance 290 is shunted by the neon discharge tube 292. The integrating condenser 247 has one of its terminals connected to the cathode of tube V–10A and the other one of its terminals connected through switch 282 to the control grid of tube V–9. Control grid of cathode follower tube V–10B is connected to the adjustable tap on resistance 290 so as to develop a corresponding voltage on its cathode. The cathode of tube V–10B is returned to the −150 volt source through serially connected resistances 293 and 294.

A regenerative feedback path is provided between the output of tube V–10B and the input of tube V–9, such feed back path comprising the serially connected thyrite resistance 297, the fixed resistance 298 and potentiometer resistance 299, which has its tap connected to the cathode of tube V–9. The purpose of the thyrite resistance 297 is to introduce nonlinearity in the feed back circuit to compensate for curvature in the characteristic curves of the amplifier tube V–9. The voltage thus developed on the cathode of tube V–10 is the range voltage and is applied to the range voltage lead 35 in the automatic position of the manually operable switch 228. This voltage on the cathode of tube V–10 consists of integrated "speed" voltage and represents the range of the tracked aircraft in terms of nautical miles on a linear scale, the scale being 15 volts per mile.

As indicated above, the voltage developed on lead 35 is applied to the control grid of tube V–2A to complete the loop with the gate width of a multivibrator output 251 being controlled by the range voltage applied through the combination of resistances 250, 256 and 258. The pulse width of the output of multivibrator V–2, controlled as a direct function of the range voltage, causes, in turn, revision of the range voltage in an amount depending upon the relationship of the incoming video with the pulse derived from the trailing edge of such gating voltage 251. Aircraft approaching the radar installation cause video pulses to coincide with the positive portions of the early gates 260, charging condenser 246, causing the "speed" voltage at the cathode of tube V–8 to rise, and the range voltage from tube V–9 to fall. Decreasing range voltage decreases the gate width of the output of the multivibrator V–2.

*Coast speed circuitry in Figure 9*

As mentioned above, the range voltage on the cathode of tube V–10 is applied to a voltage dividing circuit which includes the serially connected resistances 293A, 294. The junction point of the resistances 293A, 294 is connected through resistance 300 to the control grid of tube V–1B, the so-called 3 mile pick off tube. Tube V–1B is arranged to conduct only when the tracked aircraft is beyond 3 miles of touchdown. For that reason the tube is sensitized with range voltage as indicated above. The cathode of tube V–1B is grounded and has its anode connected to a +300 volt source through resistance 301. The anode of tube V–1B is likewise connected to a voltage dividing circuit which includes the serially connected resistance 303, potentiometer resistance 304, fixed resistance 305 and −150 volt source 306. The tap on resistance 304 is connected through the minimum coast switch 307 to the control grid of tube V–8B in the on position of such switch. In the off position of such switch 307, the control grid of tube V–8B is connected to the negative terminal of voltage source 310.

The tube V–1B is adjusted so that it becomes cut off when the range voltage corresponds to distance less than 3 miles; and when such tube V–1B cuts off, the voltage developed on the anode of tube V–1B is not only transferred in controllable amounts to the control grid of tube V–8B but is also transferred to the lead 58, which constitutes the so-called 3 mile pick off lead. The tap on resistance 304 may be adjusted to provide different minimum coasting speeds. Generally the voltage thus applied to lead 58 serves to render operative the excess error wave off circuitry in the computer unit only when the aircraft is within 3 miles of touchdown.

*Description of circuitry for developing "video on" signal in Figure 9 from range and angle gated video*

The "video on" signal is developed for control purposes. The circuitry produces for this purpose a square pulse of a high amplitude and sharp definition, the width of the pulse being equal to a time period of the entire video train within the range and angle gates, plus a 500 microsecond delay for the last pulse. Because of this additional delay of 500 microseconds, the "video on" signal is sometimes referred to as "stretched" video and is shown in Figure 12.

The range and angle gated video appearing on the anode of tube V–15B is applied through condenser 383 to the cathode of the video stretch tube V–18A. The cathode of tube V–18A is connected to the adjustable tap on resistance 384 through the resistance 385, such resistance 384 serving as a voltage dividing element since its ungrounded terminal is connected to the −150 volt source. Condenser 386 has one of its terminals grounded and the other one of its terminals connected to the tap on resistance 384, such tap being likewise connected through resistance 387 to the anode of tube V–18A. The control grid and anode of tube V–18A are interconnected and connected through resistance 388 to the control grid of tube V–18B. The cathode of tube V–18B is connected through resistance 389 to the −150 volt source. The anode of tube V–18B is connected to the −150 volt source through resistance 400. Condenser 401 is connected between the anode of tube V–18A and ground. The control grid of cathode follower tube V–19A is connected to the anode of tube V–18B. The cathode of tube V–19A is connected through resistance 403 and resistance 389 to the −150 volt source. The "video on" signal thus developed on the cathode of tube V–19A is applied to the "video on" lead 84 through the track cursor switch 284, such switch 284 being manually operated and maintained in the "track" position in normal operation of the unit.

In summary, the output of blocking oscillator tube V–15B is taken from the anode of that tube and applied to the cathode of video stretch tube V–18A. The condenser 386 is charged by such video signal but the charge may leak from such condenser 386 at a rate determined by the magnitudes of resistances 387 and 384, the resistance 384 being termed the stretch control resistance, and the tap on the same is adjusted so that tube V–18B is cut off for a period equal to a pulse repetition interval of 500 microseconds, such pulse repetition interval being that of the radar system. The effect of this circuitry therefore is the production of a "video on" signal at the cathode of tube V–19A having a duration equal to a time period of the entire video train within the range and angle gates plus a 500 microsecond delay for the last pulse. This video on signal is divided into two branches of circuitry at the cathode of tube V–19A, i. e., the video on signal storage circuitry, which includes the tube V–23A, and the acquisition control circuitry, which includes the tube V–19B. Also the video signal is applied to the "video on" lead 84 for performing certain control functions in the computer unit.

*Description of circuitry in Figures 8 and 9 for producing both range and angle gating of video, and description of features of rejection bus 40*

The range tracking circuit shown elsewhere in the Figures 8 and 9 is capable of performing its function even though the video supplied thereto over lead 262 is neither range gated nor angle gated but for purposes of accuracy, safety and definition, the video applied to lead 262 is both range and angle gated.

Briefly, the video, either standardized or unstandardized video appearing on lead 72, is applied to the control grid of the range coincidence detector tube V–14. The suppressor grid of such tube V–14 is coupled to the lead 275. When both positive video signals and positive range gates are present on control grid and suppressor grid of tube V–14 contemporaneously, tube V–14 conducts and the resulting pulse of current in the transformer 341 results in application of a pulse to the control grid of tube V–15A. The anode supply for tube V–15A comprises the angle gating voltages applied to lead 56. Thus, when the range gate video pulse developed on the grid of tube V–15A is coincident with the angle gate appearing on lead 56, the tube V–15 conducts to cause a pulse of current to flow through the transformer 343 and a resulting range and angle gated video pulse to appear on the control grid of tube V–15B. The resulting range and angle gate video signal appearing on the cathode of tube V–15B is applied to the lead 262 for purposes of effecting range tracking in the manner described previously.

The operation of this circuit may, however, be modified by signals developed in other tracking units and appearing on the rejection bus 40. Such signals appearing on the rejection bus 40 may render this circuit ineffective when such signals are coincident with the range gates applied to the suppressor grid of tube V–14.

More specifically, the video appearing on lead 72 is transferred through coupling condenser 344 to the control grid of tube V–14, such control grid being connected to the —150 volt source through serially connected resistances 345 and 346. The junction point of these two resistances 345, 346 is bypassed to ground by bypass condenser 347. The cathode of tube V–14 is grounded. The anode of tube V–14 is connected through primary winding 349 to the positive 150 volt source. The suppressor grid of tube V–14 is coupled to the range gate lead 275 through the serially connected resistance 350 and condenser 351, the junction point of resistance 350 and condenser 351 being returned to ground through the serially connected resistances 352 and 353. The junction point of resistances 352 and 353 is connected to the ungrounded terminal of condenser 347.

Also coupled to the suppressor grid of tube V–14 is the rejection bus 40 for purposes of producing the aforementioned overriding control effect occurring when pulses on the rejection bus 40 appear coincidently with range gates on lead 275. This is for the purpose of preventing two tracking units from tracking the same aircraft. For this purpose, the suppressor grid of tube V–14 is connected to the anodes of inverter tubes V–2A and V–2B. The cathodes of inverter tubes V–2A and V–2B are interconnected and returned to ground through resistance 355 which is shunted by condenser 356. Likewise, these cathodes are connected to the —150 volt source through resistance 359A. The control grids of inverter tubes V–2A and V–2B are connected through resistance 357 to the —150 volt source and are coupled by means of condenser 358 to the stationary contact 367 of the single pole double throw relay switch 360. This relay switch 360 is a part of the search-track relay 288. The tubes V–2A and V–2B are thus tubes for the purpose of converting positive signals on the rejection bus 40 and applying the same as a negative pulse to the suppressor grid of tube V–14 during, of course, the search function of the unit shown in Figure 9.

In multiplane tracking, it is understood that tracking units of the character shown in Figure 9 are duplicated and that the rejection bus 40 of each tracking unit is interconnected for the purpose of preventing more than one tracking unit tracking the same aircraft. In this respect it is noted that, while a tracking unit is performing its search function, it is receiving information, i. e., an angle gated range gate, over the bus 40 from other units while such other units are performing their track function; and that while the present unit is in the track function, it is supplying the same type of information, i. e., an angle gated range gate, to other units performing the search function so that such other units will correspondingly not track the same aircraft.

For purposes of developing such information, i. e., an angle gated range gate, the tube V–13 is connected to receive angle gates on its anode and range gates on its control grid. More specifically, tube V–13 is connected as a cathode follower coincident tube and has its anode connected to the lead 56 for receiving angle gates. The control grid of tube V–13 is connected to the range gate lead 275 through serially connected resistance 360 and coupling condenser 361, the junction point of which is connected to the —150 volt source through serially connected resistances 362 and 363. The cathode of tube V–13 is returned to ground through load resistance 364 and is connected to the stationary terminal 366 of switch 369 through condenser 369 and also to the so-called range gated automatic gain control lead RGAGC 40A. It is noted that the tube V–13 requires for its operation a 28 volt enabling bias and that such bias is supplied upon energization of relay 370 during the track function of the equipment. In order to energize relay 370, a 28 volt range gate interlock is supplied from the coder unit to the lead 74.

When relay 370 is energized, the 28 volts are applied through the relay switch 371 and resistance 372 to the junction point of resistances 362 and 363 for the aforementioned purpose of rendering tube V–13 operative.

Returning to the description of the connections to tube V–14, the output of such tube is coupled through transformer 341 to the control grid of tube V–15A. For that purpose, the cathode of tube V–15A is grounded and its control grid is returned to ground through the serially connected transformer winding 375 and resistance 376, the junction point of which is connected to the —150 volt source through resistance 377. The anode of tube V–15A is connected through the primary winding 379 of the transformer 343 to the angle gate voltage lead 56. The control grid of tube V–15B is serially connected with transformer winding 380 and resistance 377 to the —150 volt source. The anode of tube V–15B is connected through transformer winding 382 to the positive 300 volt source. The cathode of tube V–15B is returned to ground through load resistance 378 and is likewise connected to the lead 262 for purposes of applying both range and angle gated video to the tracking circuit described under a different heading. A condenser 381 is connected between the cathode of tube V–15B and one terminal of resistance 377.

In order to develop the "video on" signal described under a different heading, the range and angle gated video appearing in inverted form on the anode of tube V–15B is transferred to the cathode of tube V–18A through coupling condenser 383.

Recapitulating, standardized video appearing on lead 72 is applied to the control grid of coincidence tube V–14. In the absence of a rejection gate which may be on the rejection bus 40, and at the coincidence of the delay of the range gate applied over lead 275 to the suppressor grid of tube V–14 with the duration of the video, a signal is passed by the coincidence detector V–14 and applied to the blocking oscillator stage V–15A, V–15B. This blocking oscillator stage is angle gated by the +240 volt angle gate developed in the computer unit and appearing on lead 56. The output from the blocking oscillator stage V–15A, V–15B thus occurs only when the following conditions are fulfilled: (1) The range delay of the video coincides with the delay of the range gate; (2) during search condition there is no signal upon the rejection bus at the point determined by requirement No. 1; and (3) the video occurs within the angle gate while the unit is in its track or control function.

Video meeting these three conditions appears on the cathode of tube V–15B, i. e., lead 262 has a standardized pulse and is applied simultaneously to the control grids of early and late detector tubes V–5 and V–6 in the range tracking circuit.

As described above, the range gate appearing on lead 275 and developed across the common cathode load resistance 266 constitutes, in effect, the positive portions of both early and late gates 260 and 261. The range gate thus appearing on lead 275 is applied through condenser 361 to the control grid of cathode follower tube V–24B. A positive range gate is thus developed on the cathode load resistance 436 and applied through coupling condenser 437 to the range gate lead 44 for purposes of effecting certain control operations.

*Computer circuitry*

The computer circuitry is illustrated in Figures 10A, 10B and 11. In general, the computer performs six major functions, namely, to produce (1) angle voltage level shifting, (2) the computation of an "ideal glidepath," (3) angle air tracking, (4) course softening, (5) excess air wave off, and (6) the generation of an angle gate. In general, the azimuth and elevation angle voltages applied to the terminals 18 and 20 respectively are shifted in level as a step in the glidepath computation process. Inversion of azimuth angle voltage, made possible by the two-position switch SW–3001, permits the selection of either a "left runway" or a "right runway" approach; i. e., the radar equipment may be placed either on the left or on the right of the runway.

Range voltage generated in the tracking units described in connection with Figures 8 and 9 and the range of a tracked aircraft is applied to the computer glidepath reference generator which in general includes the input terminal 82 and the stages 451 (V–16A), 452 (V–16B, 453 (V–17A) and 454 (V–17B). Such reference generator includes the nonlinear thyrite resistances 456, 457 so as to impart a nonlinear characteristic to the range voltage applied to terminal 82. The modified range voltage is added to the shifted az-el voltages resulting in the generation of an alternating voltage representing, at the zero crossover points, an "ideal" glidepath which is so adjusted as to coincide with an actual physical "ideal" approach to a given airfield. Such alternating voltages, for azimuth purposes, appear on the lead 459 and, for elevation purposes, appear on the lead 460. The glidepath generated by this circuitry may be displayed upon the az-el monitor scope during the "search" condition of the particular channel. These alternating voltages, for azimuth purposes, appear on the lead 462 and, for elevation purposes, appear on the lead 463.

The voltage appearing on the leads 462, 463 represent, in one instance, modified range voltage added algebraically to level shifted azimuth voltage and, in the second instance, range voltage modified in a different manner added algebraically to level shifted elevation angle voltage.

In general, such alternating voltages with a periodicity of two cycles per second are applied respectively, from their leads 462 and 463 to cathode follower stages 465 and 466, each of such cathode follower stages forming an input circuit for the azimuth servo loop 467 and elevation servo loop 468. Briefly, such servo loops produce a voltage on the leads 469, 470 of servo loops 467, 468, respectively, such voltage on leads 469 and 470 constituting a substantially continuous voltage which represents the position error of the tracked aircraft in azimuth and elevation, respectively. Such voltages appearing on leads 469 and 470 are indicated on the cross pointer meter 471 and are utilized to modulate a carrier wave which is transmitted from the ground station to the aircraft for purposes of controlling the flight of the aircraft. The alternating azimuth and elevation voltages appearing in the output circuits of the cathode follower stages 465 and 466 are used to form azimuth and elevation angle gates, such angle gates being applied to the range tracking circuitry illustrated in Figures 8 and 9. Briefly, for purposes of developing such azimuth and elevation angle gates, level shifting potentiometers 472 and 473 are provided with their taps being connected to stationary contacts of the single pole double throw relay switch 474 serving to alternately apply the azimuth and elevation alternating voltages to the differential amplifier stage 475 (comprising tubes V–12A and V–12B) in the angle gate generator 477. The output of the gate generator 477 appears alternately as an azimuth and an elevation angle gate on lead 56. Azimuth angle voltage appearing on lead 18 is applied to the control grid of cathode follower tube 478. Such azimuth angle voltage is shifted in level and appears on lead 479 where the same is mixed on the control grid of cathode follower mixer tube 480 with the modified range voltage which appears on lead 459. In the left position of switch SW–3001, the level shifted azimuth voltage is mixed directly with the modified range voltage without inversion; but, in the right position of switch SW–3001, the azimuth angle voltage is not only level shifted but also inverted before being mixed with the modified range voltage appearing on lead 459.

To achieve these results the following circuitry is associated with tube 478. The cathode of tube 478 is returned to the negative ungrounded terminal of voltage source 481 through a series circuit which includes resistances 482, 483, 484, 485 and 486. The resistance 483 constitutes a so-called "touchdown adjustment for left runway operation" and has its adjustable tap connected to the left stationary contact of switch SW–3001 through the serially connected resistance 489 and adjustable resistance 490. The movable contact of switch SW–3001 is connected to lead 479 which in turn is connected directly to the control grid of the cathode follower mixer tube 480. The resistance branch comprising resistances 482, 483 and 484 has connected in shunt therewith the serially connected resistances 492 and 493, the resistance 493 comprising a potentiometer type of resistance termed the "touchdown adjustment for right runway operation" and has its movable tap connected to the control grid of the inverter tube 494 through resistance 495. Tube 494 is useful only during right runway operation; i. e., when the radar equipment is located on the right of the runway. The anode of tube 494 (V–3A) is connected through the load resistance 496 to the positive terminal of a voltage source (not shown) and is connected directly to the control grid of tube 498 (V–3B). The cathode of tube 494 is returned to ground through resistance 500 and is connected to the cathode of tube 498 through resistance 502. Tube 498 constitutes a cathode follower with its cathode connected to the ungrounded terminal of voltage source 504 through serially connected resistances 506 and 507. The junction point of resistances 506 and 507 is connected on the one hand through resistance 508 to the control grid of tube 494; and on the other hand such junction point is connected through serially connected resistances 570 and 571 to the right stationary contact of switch SW–3001.

In order to stabilize the potential appearing on the cathode of the input tube 478, a voltage regulator tube 513 is serially connected between the cathode of tube 478 and the junction point of resistances 485 and 486.

Thus, the operation of the azimuth angle voltage mixing circuit described immediately above is as follows: Azimuth angle scanning voltages varying from 52 volts to 2 volts and applied to terminal 18 appear on the grid of the cathode follower tube 478 (V–1A). The output from the stage 478 is derived from its cathode and shifted downward in level through circuitry including voltage regulator tube 513 (V–2), which stabilizes the voltage drop across the voltage dropping resistance network. When switch SW–3001 (runway select) is set to the "left position" (for operation of the radar installation at the left side of the runway), the level shifted azimuth angle voltage is resistively mixed with the reference voltage; i. e., modified range voltage which is derived in the output circuit of the cathode follower tube V–16B, and applied to the control grid of cathode follower tube V–30 (V–1B) over lead 459 which is serially connected with resistance 515, such resistance 515 being shunted by condenser 516. The output from the cathode follower stage 480 and appearing at the junction point of resistances 518 and 519 is applied through the serially connected resistances 520 and 521 to the azimuth angle tracking circuit; i. e., to the control grid of tube 465. Potentiometer resistance 483, the so-called "touchdown adjustment for left runway operation," is adjusted to provide zero azimuth angle voltage when the angular position of the radiated antenna beam passes through the aircraft touchdown point. At the same time the tap on potentiometer resistance 490 is adjusted to provide the proper excursion of the level shifted angle voltage which is added to the reference voltage; i. e., the modified range voltage.

In right runway operation, i. e., when the runway select switch SW–3001 is set to the "right position," level shifted azimuth angle voltage appearing on the tap of resistance 493 is applied to the inverter stage 494 (V–3A). The output of the stage 494 is applied to the cathode follower stage 498 (V–3B) and varied by series resistance 511, the so-called "position adjust right runway," which produces the result identical to that produced by resistance 490 in left runway operation.

For purposes of producing level shifted and inverted elevation voltage for mixing with reference voltage, the elevation angle voltage is applied to terminal 20, such terminal being connected to the control grid of inverter tube 522 through resistance 524. The cathode of tube 522 is returned to ground through resistance 525 and is connected to the cathode of tube 526 through resistance 528. The tube 526 is a cathode follower and has its cathode connected to the negative ungrounded terminal of voltage source 530 through serially connected resistances 531 and 532. The junction point of resistances 531 and 532 is connected on the one hand through resistance 533 to the control grid of tube 522; and on the other hand such junction point is connected to the control grid of the cathode follower stage 534. The cathode of stage 534 is returned through serially connected resistances 536, 537 and 538 to the —150 volt source. The resistance 537 is a potentiometer resistance and serves as a touchdown adjustment, such resistance 537 having its adjustable tap connected through resistance 540 to the control grid of cathode follower mixer stage 541. Tube 541 has its cathode connected through serially connected resistances 543 and 544 to the —150 volt source. The junction point of resistances 543, 544 is connected through lead 463 and serially connected resistances 545 and 546 to the elevation angle tracking circuit; i. e., to the control grid of tube 466. The resistance 546 is shunted by condenser 548.

Thus, elevation angle voltage varying from 2 to 52 volts, depending on the angular position of the radiated antenna beam, is applied to the control grid of the inverter amplifier tube 522 the output of which is shifted downward in level in the cathode circuit of cathode follower tube 526. This level shifted elevation voltage is shifted further downward in the cathode circuit of cathode follower stage 534, and potentiometer resistance 537 is adjusted to provide a zero potential when the antenna beam passes through the elevation touchdown position. This level shifted output from cathode follower stage 534 is added to the reference voltage; i. e., modified range voltage appearing on lead 550. Such modified range voltage is applied through the two-position glidepath select switch SW–3001. Switch SW–3001 allows inspection of one of two series potentiometer resistances 551 or 552. Either of these two resistances allows an adjustment of the output of the reference generator for a given input, and therefore an adjustment of the angle of the computed glidepath.

The range voltage generated in the range tracking unit illustrated in Figures 8 and 9 is applied to terminal 82, such range voltage serving as a measure of the range of the aircraft being tracked. Range voltage thus appearing on terminal 82 is applied to the control grid of the cathode follower tube 451 through the tap on the so-called "range factor" of potentiometer resistance 560, one terminal of such resistance 560 being grounded. The cathode of tube 451 is connected through series resistances 562 and 563 to a —150 volt source. A condenser 564 is connected between terminal 82 and the control grid of tube 451. The junction point of resistances 562 and 563 is connected through series resistances 565 and 566 to the control grid of tube 568 (V–17A), such resistances 565 and 566 being shunted by condenser 569. The control grid of tube 568 is returned to ground through the "L" thyrite resistance 456. The cathode of the cathode follower stage 568 is connected through series resistances 570, 571 and 572 to a —150 volt source. The adjustable tap on resistance 571 is connected through adjustable resistance 573 to the control grid of the cathode follower tube 575 (V–17B). Condenser 577 is connected between the tap on resistance 571 and the tap on resistance 573. The control grid of cathode follower tube 575 is returned to ground through the "M" thyrite resistance 457 and is connected to the control grid of the cathode follower tube 452. The cathode of tube 452 is connected through series resistances 578 and 579 to a —150 volt source. The cathode of tube 575 is connected through series resistances 580 and 581 to a —150 volt source, and the junction point of such resistances 580 and 581 is connected to the movable contact of the glidepath select switch SW–3001 for supplying modified range voltage to the control grid of tube 541 where such modified range voltage is mixed with level shifted elevation angle voltage. On the other hand, the output appearing at the junction point of resistances 578 and 579 is transferred over lead 459 and resistance 515 to the control grid of tube 480 to which is also applied level shifted azimuth angle voltage.

Thus, in operation of the reference voltage generating means described above, range voltage, as generated in the tracking unit illustrated in Figures 8 and 9, is applied to the cathode follower tube 451 through the range factor resistance 450, the tap on resistance 560 being adjusted to determine the portion of the full excursion of range voltage applied to the reference generator circuitry. This range voltage is shifted downward in level at the cathode of tube 451 and applied to the control grid of the cathode follower tube 568. The potential of the control grid of tube 568, however, is modified by the thyrite resistance 456. The characteristics of this voltage modification are such that increasing applied potentials do not produce the same relative increase in voltage drop across resistance 456. Stated in a different manner, additional increments of input voltage are not matched by equal increases in voltage at the cathode of tube 568. The output of tube 568 is applied to the control grid of cathode follower tube 575 where further modifications are imparted by the thyrite resistance 457. Thyrite resistances 456 and 457 are such that the added characteristics imposed by these two elements cause the voltage variations following the general equation $$E_r = (E_i)(1 - 1/n)$$

*Theoretical considerations in establishing ideal glidepath (elevation) and ideal course (azimuth) lines with reference to Figures 13 and 14*

It has been stated that flight errors are computed from predetermined ideal glidepath (elevation) and course (azimuth) lines, which are functions of a single general expression involving the geometry of runway approaches. The following paragraphs are devoted to a discussion of the derivation of this general reference function and to its application within the AGCA system.

The problems of reference voltage generation and error computation are greatly simplified by generalizing the equations for azimuth and elevation glidepaths. Referring to Figure 13, the angular position of the aircraft is shown to be equal to $\sin^{-1}a/R$. For small angles, the value of the sine of the angle is approximately equal to the angle expressed in radians, and the position angle for small angles is equal to:

$$\theta=Ka/r \quad (1)$$

where $K$=degrees per radian. This is the general equation for the reference angle of the aircraft, with respect to a line extending from the radar installation parallel to the runway. If the numerator and denominator are multiplied by $(R_{td})$, the following relationship is obtained:

$$\theta=(Ka/R)(R_{td}/R_{td}) \quad (2)$$

or $$\theta=(Ka/R_{td})(R_{td}/R) \quad (3)$$

arbitrarily equating:

$$R/R_{td}=\text{“}n\text{”} \quad (4)$$

which states that the factor "$n$" is now equal to the range of the aircraft from the radar installation divided by the range of the radar installation from the point of touchdown. This states that "$n$," which may be called a range ratio factor, is equal to unity when the aircraft is at the point of touchdown. In the further development of the equation, the distance from the radar installation to touchdown is the unit "$n$," and the range to the aircraft will be expressed in terms of units, $n_1$, $n_2$, etc., representing this distance. Equation (3) now becomes:

$$\theta=(Ka/R_{td})(1/n) \quad (5)$$

but $$Ka/R_{td}-\theta_{td} \quad (6)$$

and therefore, $$\theta=\theta_{td}(1/n) \quad (7)$$

Referring again to Figure 13, it is seen that as the range increases from $n_1$ to $n_2$ to $n_3$, and to $n_4$, it increases by multiples of 2, 3 and 4 times the range to touchdown. The angle $\theta$ consequently decreases to ½, ⅓, and ¼ its value at touchdown. This angular variation has the form, therefore, of the expression $1/n$, for values of "$n$" from one to ten, considering the range of the system to be ten miles. The reference angle for all values of range may now be expressed as:

$$\theta_{ref}=\theta_{td}(1/n) \quad (8)$$

This angle, $\theta_{ref}$, may be expressed as a position voltage:

$$E_p=(K_{az}\theta_{td})(1/n) \quad (9)$$

where $$K_{az}=\text{volts/degree in azimuth} \quad (10)$$

a factor which is dependent upon amplification factors and potentiometer adjustments in the control circuits. In Equation 1, position voltage will approach zero at touchdown if the term $K_{az}\theta_{td}$ is subtracted from the equation:

$$E_p=(K_{az}\theta_{td})(1/n)-(K_{az}\theta_{td}) \quad (11)$$

or $$E_p=(K_{az}\theta_{td})(1/n-1) \quad (12)$$

As "$n$" approaches infinity, $E_p$ will approach $(-K_{az}\theta_{td})$; as "$n$" approaches unity, $E_p$ approaches zero. The elevation reference angle will be developed by the same process. Offset of the radar installation from the runway is not considered, as the errors involved are negligible. Again using the glidepath parallel as a reference, it will be noted that, for the elevation case, the position angles are in the fourth quadrant instead of the first. General equations will be:

$$E_p=(-\theta_{td})(K_{el})(1/n-1) \quad (13)$$

or $$E_p=(K'_{el}\theta_{td})(1-1/n) \quad (14)$$

Comparing the general equations for azimuth and elevation:

$$\text{Azimuth: } E_p=(K'_{az}\theta_{td})(1/n-1) \quad (15)$$

where $K'_{az}$=2.5 volts per degree (maximum), and $$\theta_{td}=4\text{–}10 \quad (16)$$

$$\text{Elevation: } E_p=(K'_{el}\theta_{td})(1-1/n) \quad (17)$$

where $K'_{el}$—7.14 volts per degree (maximum), and $\theta_{td}$=2–3 degrees. It may be noted that $K'_{az}\theta_{td}$ is in the same voltage region as $K'_{el}\theta_{td}$. They are of opposite polarity because one is a function of $(1/n-1)$ and the other a function of $(1-1/n)$. If elevation position voltage is applied to an amplifier with a gain of −1, the elevation reference voltage will be:

$$E_p=(K'_{el}\theta_{td})(1/n-1) \quad (18)$$

The equations for azimuth and elevation reference voltage for an aircraft approaching touchdown on the glidepath are now of the same form:

$$E_p=(K\theta_{td})(1/n-1) \quad (19)$$

If the factors $K'_{az}$ and $K'_{el}$ are adjusted to have the same scale of values, it is possible to generate a single reference voltage for both azimuth and elevation:

$$E_p=(K'_{az}\theta_{td})(1/n-1) \quad (20)$$

$$E_p=(K'_{el}\theta_{td})(1/n-1) \quad (21)$$

$$K'_{az}/K'_{el}=\theta_{td}/\theta_{td} \quad (22)$$

The reference angle computer must generate a voltage:

$$E_{ref}=E_a(1/n-1) \quad (23)$$

where $$E_a=K'_{az}\theta_{td}=K'_{el}\theta_{td} \quad (24)$$

Since $K'_{az}$ and $K'_{el}$ are negative (refer to Figure 22):

$$E_{ref}=E_a(1-1_n) \quad (25)$$

The azimuth and elevation position voltages have positive polarity. The reference voltage is also of positive polarity as seen from Equation 25. Reference to Figure 14, the azimuth position voltage is shifted downward in level so that the position voltage for zero range will be zero volts. The elevation position voltage will be shifted downward and inverted, so that its form is as shown in Figure 14. Since both voltages will then have the same form, they may be adjusted to the same scale, as noted above. If $E_a$ (Equation 25) is adjusted to equal $(K\theta_{td})$, then the equations for error as the aircraft approaches touchdown on the runway centerline are:

$$E_p+E_{ref}=0 \quad (26)$$

or $$K'\theta_{td}(1/n-1)+E_a(1-1/n)=0 \quad (27)$$

The elevation and azimuth angle tracking circuits are substantially identical in nature and function and for that reason, the following detailed description of the elevation angle tracking circuit suffices to describe the azimuth angle tracking circuit.

The elevation angle tracking circuit includes the cathode follower tube 466 (V–20A), the amplifier tubes 600, 601 (V–31A, V–31B), the clamp tubes 604, 605 (V–21A, V–21B), the cathode follower tube 606 (V–33B), the cathode follower stage 607 (V–33A), the limiter tubes 608, 609 (V–32A, V–32B), the amplifier tubes 612, 613 (V–22A, V–22B) and the cathode follower tube 614 (V–20A).

The elevation angle tracking circuit comprises a servo loop with a feedback path provided by the lead 470.

The voltage developed on lead 470 is continuous in nature and represents the position error of the tracked aircraft. The control grid of cathode follower tube 466 is connected to lead 470 through resistance 620, so that the same is sensitive to position error; and such control grid is likewise connected with resistance 546 so as to be sensitive to the algebraic sum of reference voltage and level shift, i. e., modified range voltage and level shifted elevation voltage. This voltage applied through resistance 546 is undulatory in character and its zero value, as mentioned previously, corresponds to a point on the predetermined glidepath. The cathode of tube 466 is connected to a −150 volt source through three parallelly connected resistances and resistance 620, such parallel resistances comprising resistance 621, 622, 623. The tap on resistance 621 is connected to elevation angle gate generating means as described elsewhere herein for the purpose of producing an angle gate, which, in turn, is applied to the range tracking unit for forming angle gated video.

The tap on resistance 623 is connected to the control grid of the amplifier tube 600 through resistance 625. The cathodes of tubes 600 and 601 are both grounded and the anode of tube 600 is connected through resistance 626 to a positive 300 volt source. The anode of tube 600 is connected to the control grid of tube 601 through a network which includes the parallel connected resistance 628 and condenser 629. The control grid of tube 601 is connected through resistance 630 to the −150 volt source and such grid is also bypassed to ground by means of condenser 632. The anode on tube 601 is connected through resistance 632 to the +300 volt source and the voltage developed on such anode is transferred through resistance 635 to, on the one hand, the cathode of tube 604 (V–21A) and, on the other hand, to the anode of tube 605 (V–21B). The control grids of tubes 604 and 605 are connected through resistances 640, 641 respectively to lead 642, to which in turn is applied the video on signal from terminal 84. Such video on signal is described elsewhere herein, is developed in the tracking unit and is present during the time "radar hits" are being made on the tracked aircraft. The lead 642 is connected through resistance 644 to a −150 volt source to provide bias for the control grids of tubes 604 and 605. The anode of tube 604 and cathode of tube 605 are connected to the control grid of tube 606 and are returned to ground, through an integrating network which comprises a serially connected condenser 646 and resistance 647.

The tube 606 is a cathode follower and has its cathode returned to ground through resistance 649. Also, such cathode is connected to a −150 volt source through serially connected resistances 650 and 651. The resistance 650 is connected in shunt with condenser 652. The junction point of resistances 650, 651 is connected through resistance 654 to the control grid of tube 612.

The anode of tube 612 is connected through load resistance 656 to a +300 volt source and is likewise connected to the control grid of tube 613. The cathode of tube 612 is returned to ground with resistance 658. Condenser 659 is connected between the control grid 612 and the cathode of tube 613.

The tube 613 is a cathode follower and has its cathode returned to ground through the serially connected resistances 670 and 658. Also, the cathode of tube 613 is connected to a −150 volt source through the serially connected resistances 672, 673, 674 and 675. The junction point of resistances 674 and 675 is connected through the single pole double throw relay switch 680 (during tracking) to the control grid of the cathode follower tube 614. The adjustable tap on resistance 673 is connected to the movable contact of the single pole double throw relay switch 681.

The cathode of tube 614 is connected through lead 470 and resistance 620 to the control grid of tube 466 to complete a feedback loop. Also, the cathode of tube 614 is connected to an adjustable tap on the resistance 682, one terminal of resistance 682 being connected to resistance 683, and the other terminal of resistance 682 being connected to lead 684, for purposes of transferring air voltage to the air indicator.

*Angle gate generator in computer in Figure 10B*

The circuitry described under this heading is used to prevent a so-called angle gate which is applied to the range tracking unit shown in detail in Figure 9. In general, the purpose of this angle gate is to gate the video signals applied to the range tracking circuit in such a manner that such video signals are allowed to pass to the tracking circuit only during the time during which radar hits are being made on an aircraft being tracked, as illustrated in Figure 12.

It is noted that the ideal course of glidepath, as described elsewhere herein, is represented by the zero voltage crossover points on alternating voltages, one corresponding to azimuth, i. e., course, and the other corresponding to elevation, i. e., glidepath. These alternating voltages comprise, for azimuth purposes, the addition of level shifted azimuth angle voltage to the reference voltage, i. e., modified range voltage; and, for elevation purposes, comprise the algebraic sum of level shifted elevation angle voltage and the reference voltage, i. e., the modified range voltage.

The angle tracking servoes have supplied thereto these two different alternating voltages representing at the zero voltage crossover points an ideal glidepath and course which are so adjusted to coincide with an actual physical "ideal" approach to a given airfield. The voltage on lead 469 in the case of azimuth and lead 470 in the case of elevation represent the error of the aircraft with respect to such ideal course or glidepath as described previously herein. The grid of tube 465, being connected to the junction of resistors 521 and 516, bears a voltage which is the sum of the aforementioned alternating voltage and the aforementioned error voltage. This grid voltage is therefore an alternating voltage whose zero crossover point represents the time the beam crosses the aircraft, whether or not the aircraft is on the ideal course, provided, of course, that the aircraft is being tracked. Likewise, in the elevation case, the voltage at the grid of tube 466 is an alternating voltage whose zero crossover point defines the position of the aircraft. These voltages are applied to opposite stationary contacts of the relay switch of the az-el relay switch 474 and are supplied, for azimuth purposes, from lead 840 which is connected to the adjustable tap on the potentiometer resistance 472; and for elevation purposes, such alternating voltage is supplied over lead 841 which is connected to the adjustable tap on the potentiometer resistance 621.

The movable contact of switch 474 is connected through resistance 842 to the control grid of the first tube 844 and the differential amplifier 475. Tube 846 comprises a second tube of such differential amplifier. The cathodes of tubes 844 and 846 are returned to ground through a common resistance 847. The anode of tube 844 is connected to a +150 volt source through resistance 848 and is connected to the control grid of tube 850. The control grid of tube 846 is grounded and its anode is connected to a +150 volt source through resistance 851 and such anode is also connected to the control grid of tube 853.

In general, the circuitry associated with the differential amplifier 475 is so arranged that the output of both sections 844, 846 is zero for zero input at the control grid of tube 844. For other values of input voltage, the output of one of the sections 844, 846 is positive, resulting in a wave form on the connected cathodes of tubes 855 of the character illustrated at 856. This wave form 856 is shifted in level through circuitry including the voltage regulator tube 858 and is made available in two circuit branches through adjustable tubes on the resistances 860, 861.

For this purpose, the tubes 850, 855 are cathode followers and each have their cathode connected to one terminal on tube 858, the other terminal on tube 858 being connected to a −150 volt series through resistances 864, 861 and 865. Resistance 860 is connected in shunt with resistance 861. The taps on resistances 860 and 861 are connected to opposite stationary contacts of the az-el relay switch 867, which has its stationary contact returned to ground through resistance 870 and which is connected to the control grid of tube 872 through resistance 873.

Tube 872 has its anode connected to the control grid of tube 875 and such anode is likewise connected to a +300 volt source through resistance 876. The cathode of tube 872 is connected through resistance 877 to a −150 volt source and to one terminal of the neon tube 878; such cathode is also connected to a stationary contact of relay switch 879.

The tube 875 has its anode connected to a +300 volt source and its cathode returned to ground through resistance 881, such cathode being also connected to terminal 56 which constitutes the az-el angle gate terminal.

The width of the angle gate produced by this circuitry is now described. The point at which voltage wave form 856 (approaching zero from either direction) is effective in cutting off the flow of space current to tube 872 is separately determined for the azimuth and elevation functions by adjustment of the taps on resistances 861 and 860. Application of the negative wave form 856 to the control grid 872 results in a positive D.-C. gate on the cathode of cathode tube 875 of the character illustrated at 882.

It is observed that the angle gating circuitry described above is operative only after initiation of the "control" condition, i. e., after confirmation by the aircraft, at which time a ground is removed from the cathode of tube 872, i. e., upon application of the +28 volt confirmation voltage to the relay winding 885, which has associated therewith the aforementioned switch 879.

By thus providing the angle gate 882 and applying the same to the tracking unit as described elsewhere herein, gating of azimuth and elevation video targets is achieved. Such gating is desirable to prevent the tracking of undesired targets at the same range but at varying angles from the desired video.

*Cursor generator illustrated with reference to Figures 16 and 17*

While described previously in connection with Figures 1 and 5, the glidepath course line 149A (Figure 6) and runway course line 150A, may be produced using the cursor generator described in the copending application of Raymond B. Tasker, Serial No. 222,512, which has been allowed, such glidepath and course line being preferably produced using the means and techniques described under this particular heading.

The cursor generator in Figures 16 and 17 includes a servo loop using a D.-C. amplifier and two thyrite elements. The amplifier includes stages 1100, 1101 and the two thyrite resistors are the thyrite resistances 1102 and 1103. The output of the amplifier 1100, 1101 is returned through circuitry containing such thyrite elements, whose characteristics are imparted to the amplifier's output. This modified output is returned to the input of the first D.-C. amplifier 1100 in opposition to the input voltage, such input voltage comprising level shifted azimuth or elevation angle voltage, as the case may be, which is selected by single pole double throw relay switch 1104.

In seeking to achieve a zero input, the D.-C. amplifier 1100, 1101 provides a delay voltage for the multivibrator stage 1107. The characteristic of such delay multivibrator 1107 is such that it will produce an output meeting the conditions for the display of an "ideal" glidepath. The output of the delay multivibrator 1107 is applied to a blocking oscillator stage 1108 which, in turn, is coupled to the terminal 42, such terminal being connected to an intensity control electrode of the cathode ray tube 11 (Figure 6).

The output of the stage 1108 constitutes a series of pulses, the individual pulses being delayed in different amounts so as to produce an ideal reference glidepath and course line for an aircraft under AGCA control.

It is noted that portions of the circuitry described under this heading are similar to those used in glidepath computation circuitry of the AGCA computer, in that cursor pulse delay voltages are derived from level shifted azimuth and elevation angle voltage by the aforementioned electronic servo loop using the thyrite elements 1102, 1103.

The azimuth and angle elevation voltages are first level shifted and for that purpose, the azimuth angle voltage appearing on lead 1110 is applied to the control grid of tube 1111, which is returned to ground through resistance 1112. The tube 1111 is a cathode follower and has its cathode connected to a negative 150 volt source through the "touchdown course" resistance 1114 and resistance 1115. The tap on resistance 1114 is connected to the control grid of the cathode follower tube 1117 which has its cathode connected to a −150 volt source through resistance 1120. The cathode of tube 1117 is connected through the adjustable "distant range course" resistance 1121, to a stationary contact of switch 1104 to provide to such terminal a level shifted azimuth angle voltage.

The elevation angle voltage appearing on lead 1125 is applied through resistances 1126 and 1127 to the control grid of the inverter amplifier tube 1128, which has its cathode returned to ground through resistance 1130 and which has its anode connected to a +300 volt source through resistance 1131.

The anode of tube 1128 is connected to the control grid of cathode follower tube 1132, which has its cathode connected to the cathode of tube 1128 through resistance 1133 to provide a regenerative connection. Also the cathode of tube 1132 is connected to a −150 volt source through serially connected resistance 1135, the "touchdown glidepath" resistance 1136 and resistance 1137. The junction point of resistances 1136, 1137 is connected through resistance 1138 to the junction point of resistances 1126, 1127. The adjustable tap on the "touchdown glidepath" resistance 1136 is connected through the adjustable "distant range glidepath" resistance 1140 to a stationary contact of switch 1104 to provide a level shifted elevation angle voltage on such contact.

The movable switch element of switch 1104 operated by periodically energizing the relay winding 1150 with az-el relay voltage serves to supply a level shifted azimuth or elevation angle voltage through resistance 1151 to the control grid of tube 1100. The control grid of tube 1100 constitutes a part of the input circuit to the servo loop which is now described in detail.

The cathode of tube 1100 is grounded and the anode of the same tube is connected to a +150 volt source through resistance 1152. Also, the control grid of tube 1100 is connected to a −150 volt source through the serially connected resistances 1154, 1155.

It is noted that the resistance 1155 is connected in the cathode circuit of the cathode follower tube 1156 so as to supply, in degenerative sense, a feedback voltage through resistance 1154 to the control grid of the input tube 1100.

The amplified voltage appearing on the anode of tube 1100 is transferred to the control grid of tube 1101 through resistance 1157 which is shunted by condenser 1158. The control grid of tube 1101 is connected to a −150 volt source through resistance 1160 and the cathode of such tube is grounded. Resistance 1157 may be 2.2 megohms, condenser 1158 may be 22 microfarads, and resistance 1160 may be 3.3 megohms.

The anode of the amplifier tube 1101 is connected to a +150 volt source through resistance 1162 and such anode is conductively connected to the control grid of the amplifying tube 1163 through resistance 1164 so that the amplified voltage appearing on the anode of tube 1101 is applied to the control grid of tube 1163.

The control grid of tube 1163 is connected to a −150 volt source through resistance 1166. The anode of tube 1163 is connected to a +300 volt source through resistance 1168. The cathode of tube 1163 is connected to ground through resistance 1170 and is also connected to the so-called "cursor range voltage" lead 1172 through resistance 1174. Also, the cathode of tube 1163 is connected to a −150 volt source through resistance 1175.

The amplified voltage appearing on the anode of tube 1163 is connected through the single pole double throw switch 1177 (in its "operate" position) to the control grid of the cathode follower tube 1179 which has its cathode connected to the aforementioned lead 1172 and also to a −150 volt source through resistance 1180. This lead 1172 upon which the "cursor range voltage" appears is returned to ground through resistance 1181 and the so-called "course linearity" resistance 1184. The junction point of resistances 1181, 1184 has connected thereto one terminal of an adjustable so-called "glidepath flare" resistance 1185. The other terminal may have applied thereto, if desired, voltages varying in a predetermined manner for purposes of imparting a "flare" to the electronically produced glidepath, or such other terminal may be periodically grounded through a switch of the az-el relay as indicated in Figure 17. The voltage thus developed on the lead 1172 is transferred in a degenerative sense to the control grid of the tube 1100 by means which are now described in detail.

Lead 1172 is bypassed to ground through a one-tenth microfarad condenser 1188, which acts as a filtering condenser assuring the application of only substantially continuous voltages to the control grid of tube 1190 through the so-called "high adjust" resistance 1191 which is shunted by condenser 1193. Resistance 1191 may have a total resistance of 1 megohm and condenser 1193 may be 22 microfarads.

The "L" thyrite resistance is connected between the control grid of tube 1190 and ground so that the nonlinear characteristic of the thyrite produces a desired effect on the voltage applied from lead 1172 to such control grid.

The tube 1190 is a cathode follower and has its cathode connected to a −150 volt source through serially connected resistances 1195 and 1196. The resistance 1195 is termed a "thyrite zero set" resistance and has its adjustable tap connected through a so-called "low adjust" resistance 1197 to the control grid of the cathode follower tube 1156. The resistance 1197 is shunted by condenser 1199. The resistance 1197 may have a value of 100,000 ohms and condenser 1199 may be 122 microfarads.

The "M" thyrite resistance 1103 is connected between the control grid of the cathode follower tube 1156 and ground so that its nonlinear characteristics are imparted to the voltage applied to such control grid. The voltage thus developed on the cathode of tube 1156 is applied through resistance 1200 and 1154 to the control grid of tube 1100.

The servo loop described immediately above, which includes the feedback "course range voltage" lead 1172 operates such that the output voltage, i. e., the voltage feedback to the control grid of tube 1100 seeks to balance itself against input potentials, i. e., elevation or azimuth angle voltages, as the case may be, applied through resistance 1151, thereby creating a virtual ground at the control grid of tube 1100, since the feedback path includes the thyrite resistances 1102 and 1103 which impart their characteristics upon the voltage and ultimately return to the control grid of tube 1100.

In seeking the aforementioned balance at the control grid of tube 1100, the voltage appearing on the lead 1172 varies in a predetermined manner as a function of time, and, of course, as a function of azimuth or elevation angle voltage, as the case may be. Theoretical considerations involved in these functional variations of voltage on lead 1172 in relationship to the physical position of the glidepath and course line with respect to the geometry of an aircraft landing field and the disposition of radar equipment adjacent to such landing field, are more fully described in the aforementioned copending application of Raymond B. Tasker et al., Serial No. 222,512.

The desired variation of voltage on lead 1172 is applied through the tap on resistance 1184 to the control grid of tube 1204, which constitutes an element of a range delay generator functioning to produce a voltage pulse on lead 1205, such pulse on lead 1205 being time spaced, i. e., delayed, with respect to the appearance of a trigger on the input lead 12, in acordance with the value of voltage appearing at trigger time, on lead 1172. The circuitry for developing such pulse on lead 1205 is now described in detail.

AGCA system triggers appearing on the input lead 12 are coupled through condenser 1209 to the control grid of tube 1210, which has its cathode grounded and its control grid connected to a −150 volt source through resistances 1212 and 1213, the junction point of resistances 1212, 1213 being returned to ground through resistance 1214, and the anode of tube 1210 is connected together with the anode of tube 1204 to a +300 volt source through voltage dropping resistance 1215.

The cathode of tube 1204 is returned to ground through serially connected resistance 1218 and the so-called "touchdown adjust" resistance 1219, such resistance 1219 being shunted by resistance 1220.

The amplified trigger pulse appearing on the anode of tube 1210 is applied through condenser 1221 to the control grid of tube 1222 which has its cathode interconnected through the cathode of tube 1204 and which has its anode connected to a +300 volt source through resistance 1224. The control grid of tube 1222 is connected to a +300 volt source through resistance 1225 so that normally, in its quiescent state, tube 1222 is conducting heavily to cause the voltage on the cathode of tube 1204 to be relatively high during such quiescent period of tube 1222.

However, upon the application of a negative pulse from the anode of tube 1210, the flow of space current through tube 1222 is greatly diminished. The resulting pulse appearing on lead 1205, which is delayed in an amount depending upon the voltage of lead 1172, is applied to the pulse generator circuitry 1108. For that purpose, the cathode of tube 1204 is connected through condenser 1227 to the control grid of the trigger tube 1228 of the blocking oscillator stage 1108. This circuitry of the blocking oscillator stage is conventional and for that reason need not be described in detail, but functions to produce sharpened pulses at the cathode of the output tube 1230, such sharpened pulses being applied through condenser 1231 to the cursor output terminal 42.

Thus, the thyrite modified feedback voltage is applied as a range delay control potential causing the blocking of the oscillator blocking stage 1108 to occur at the desired range delay for the particular angular position specified.

*Channel glidepath and course display on cathode ray tube using re-arranged circuitry in Figures 9, 10A and 10B*

As explained herein, an "ideal" glidepath and course line are created electronically by adding algebraically, on the one hand, level shifted azimuth angle voltage and modified range voltage, i. e., reference voltage; and, on the other hand, the "ideal" course line is produced by adding algebraically level shifted azimuth angle voltage and modified range voltage, i. e., reference voltage. By this expedient two alternating voltages having a frequency in the order of two cycles per second but displaced many degrees in phase are developed. The zero crossover points of these cyclically varying voltages represent the "ideal" glidepath and course line, as the case may be.

These alternating voltages, as described elsewhere herein, are used to create angle gates for gating video applied to the range tracking circuit and also for developing azimuth and elevation position error control signals for transmission to an aircraft to control its flight.

The arrangement described presently has for its purpose to allow visual observation of the ideal glidepath and ideal course line as determined by thyrite elements 570 and 457 in the reference voltage generator (Figure 10A). To accomplish this purpose circuitry in Figures 9, 10A and 10B are re-arranged electrically. Such circuitry is re-arranged upon setting of the "track-cursor" switch 284 (Figure 9) to its cursor position. When set to the "track" position such switch 284 provides a function of normal automatic tracking or searching, as the case may be. When set to the "cursor" position the following conditions are effective: (1) the "video on" signal, which normally in tracking operation appears on lead 84, is replaced by a fixed potential of approximately 60 volts which is developed using a voltage dividing network which includes resistances 1000 and 1001, such resistances being serially connected between ground and a +150 volt source with the junction point of such resistances 1000 and 1001 connected to a stationary contact of the composite switch 284; (2) a second switch 1002 of the composite switch 284 causes the application of 28 volts to the relay winding 283 to effect operation of the associated single pole double throw relay switches 282 and 287, and such voltage of 28 volts is applied from the lead 1003; and (3) switch 1006 causes a −150 volt source to be connected to the control grid of tube V–17A through resistance 433 to thereby supply a high bias to tube V–17A to assure its cutoff so that it is ineffective to pass the late index mark.

Energization of the aforementioned relay winding 283 results in a re-arrangement of the circuitry associated with the tube V–9 which, as recalled, in the tracking function operates as a second integrator. With the circuitry re-arranged, tube V–9 serves as a D.-C. amplifier with the amplified output appearing as a "range voltage" at the cathode of tube V–11B. More specifically, in such case the control grid of tube V–9 is connected through relay switch 282 and resistance 1008 to the terminal 64 to which is applied cursor information which is developed in the circuitry shown in Figures 10A, 10B as described hereinafter. In general, the input to tube V–9 comprises a D.-C. voltage applied through the aforementioned resistance 1008 which is shunted by condenser 1009, the junction point of element 1008, 1009 being returned to ground through resistance 1010.

The anode of tube V–9 is connected through relay switch 289 to the control grid of tube V–10A since, in this condition, the relay winding 286 is energized. It is apparent that the amplified voltage on tube V–9 appears in modified form at the cathode of tube V–10B and thus on the range voltage lead 35. This voltage appearing on lead 35 is applied, as previously described, to the control grid of the delay multivibrator V–2A, and index marks are generaed by the tube V–16, as described previously in connection with range tracking. The late index mark, however, is removed due to the bias voltage applied to the grid circuitry of tube V–17A. Thus, the output of mixer tube V–17B consists of the early marks only. The display as seen on the az-el indicator consists of the early index marks, occurring at such range delays and at such angles that they form a pattern plotting the computed course and glidepath lines. To achieve this result, such circuitry is provided in Figures 10A and 10B in the manner indicated in block diagram in Figure 15 for computing a servo loop in which a suitable continuous voltage is supplied to the input of tube V–9A over lead 1011, and a "range voltage" is supplied over lead 1012 to the thyrite reference generator.

With respect to Figures 10A, 10B and 15, the "range voltage" appearing on lead 35 is applied over lead 1012, i. e., terminal 82, to the same reference voltage generator used in the tracking function. As in the tracking function, azimuth and elevation angle voltages are shifted in level and applied to two identical amplifier channels after mixing with the range voltage as modified by the thyrite reference generator. Such amplifier channels, however, in this instance comprise only a portion of the corresponding azimuth and elevation angle tracking circuits. More specifically, the azimuth amplifier channel comprises the stages V–4A and V–28A only, and similarly the elevation amplifier channel includes the stages V–20A and V–31A only. The amplified voltage appearing on the anode of tube V–28A is applied through condenser 1013 to the lead 1014 which, in the de-energized condition of relay winding 1015, is connected to the control grid of tube V–4B. Tube V–4B is a cathode follower and has its cathode connected through lead 469 and resistance 1016 to the control grid of tube 465 to complete a feedback loop. It is noted that condenser 1017 is connected between the lead 1014 and ground and that the anode of tube V–28A is connected to a −150 volt source through the serially connected resistances 1018 and 1019. Resistances 1018 and 1019 are each one megohm. Condensers 1013 and 1017 have capacities respectively of 22 and 150 micro-microfarads.

The elevation circuitry is similar to the azimuth circuitry described and for that reason a detailed description of the elevation channel is not presented in this instance.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, means deriving a voltage, the intensity of which is representative of the range of an object being tracked, means for deriving a varying voltage, the intensity of which at one particular instant is representative of the angular position of the tracked object while positioned on an ideal flight path, and means combining said first voltage and second voltage to produce an alternating voltage, the crossover point of which represents said ideal flight path for the object.

2. In an arrangement of the character described, means deriving an electrical characteristic representative of the range of an object being tracked, means producing a second varying electrical characteristic, the value of which at one particular instant is representative of the angular position of said object while positioned on an ideal flight path, means combining said first characteristic and said second characteristic to produce a third characteristic which represents said ideal flight path for said object.

3. In an arrangement of the character described, means producing a first voltage which varies linearly with respect to the range of an object being tracked, means deriving a second varying voltage which at one particular instant has a value representative of the angular position of the object while said object is positioned on an ideal flight path, a nonlinear network, means coupling said first voltage to said nonlinear network, and means combining said second voltage with said first voltage as modified by said nonlinear network to produce an alternating voltage, the crossover of zero points of which are representative of said ideal flight path for the object.

4. In an arrangement of the character described, a source of voltage, the instantaneous magnitude of which represents the range of an object being tracked, an electron discharge device having a control grid and a cathode, a nonlinear circuit element coupled between said control grid and said cathode, means coupling said source to said nonlinear circuit element, a source of varying voltage, the instantaneous magnitude of which at one particular instant is representative of the angular position of the object being tracked while positioned on an ideal flight path, a level shifting network coupled to said source for developing a level shifted voltage, means coupling said level shifted voltage with the output circuit of said electron discharge device to produce an alternating voltage, the zero crossover points of which are representative of said ideal flight path of the object.

5. In an arrangement of the character described, for developing a characteristic representative of the ideal flight path of an object, means developing a voltage representative of the range of the object being tracked, antenna beam scanning means, means operating synchronously with said antenna beam scanning means to produce a voltage, the magnitude of which is representative of the angular position of the antenna beam, means combining said first voltage and said second voltage to produce a characteristic representative of the ideal flight path of said object.

6. In an arrangement of the character described wherein radar equipment is located at a point adjacent to and noncoincident with the touchdown point which terminates an ideal flight path for an aircraft in its flight through an approach zone to an aircraft landing field, the combination comprising antenna beam means scanning through said approach zone to derive echoes from aircraft in said zone, means deriving an electrical characteristic representative of the angular position of said antenna beam, means for developing a characteristic range voltage representative of the range of the aircraft, and means combining the first mentioned characteristic with the second mentioned characteristic to produce a third characteristic representative of the ideal flight path of the aircraft through said approach zone.

7. The arrangement as set forth in claim 6 in which said second characteristic representative of range is applied to a nonlinear network to derive a modified reference voltage which is combined with said second characteristic to produce said third characteristic.

8. In an arrangement of the character described wherein radar equipment is located adjacent to and noncoincident with a touchdown point terminating an ideal flight path for an aircraft flying through an approach zone to an aircraft landing field, the combination comprising means deriving a first characteristic representative of the range of the aircraft, means deriving a second varying characteristic, the value of which at a particular instant is representative of the angular position of the aircraft while on an ideal flight path, nonlinear circuit means, and means modifying one of said characteristics with said nonlinear circuit means and combining said characteristics after one of said characteristics has been modified by said nonlinear circuit means, to produce a third characteristic representative of the ideal flight path of said aircraft.

References Cited in the file of this patent

UNITED STATES PATENTS

| | | |
|---|---|---|
| 2,438,112 | Darlington | Mar. 23, 1948 |
| 2,444,771 | Fyler | July 6, 1948 |
| 2,483,644 | Kelsey | Oct. 4, 1949 |
| 2,579,471 | Buckbee et al. | Dec. 25, 1951 |
| 2,589,965 | Rost et al. | Mar. 18, 1952 |